US009746240B2

(12) United States Patent
Rivera et al.

(10) Patent No.: US 9,746,240 B2
(45) Date of Patent: Aug. 29, 2017

(54) LUMBER KILN CONVEYOR SYSTEM

(71) Applicant: USNR, LLC, Woodland, WA (US)

(72) Inventors: Alejandro Rivera, St. Augustine, FL (US); Alan Robbins, Jacksonville, FL (US); Wade Beery, Orange Park, FL (US); Walter Holland, Jacksonville, FL (US); Christopher W. Blomquist, Ridgefield, WA (US)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 14/728,949

(22) Filed: Jun. 2, 2015

(65) Prior Publication Data
US 2015/0345865 A1  Dec. 3, 2015

Related U.S. Application Data

(60) Provisional application No. 62/007,153, filed on Jun. 3, 2014, provisional application No. 62/141,389, filed on Apr. 1, 2015.

(51) Int. Cl.
B65G 43/08 (2006.01)
B65G 39/18 (2006.01)
(Continued)

(52) U.S. Cl.
CPC ............ *F26B 25/001* (2013.01); *B65G 39/18* (2013.01); *B65G 43/08* (2013.01); *F26B 15/122* (2013.01);
(Continued)

(58) Field of Classification Search
None
See application file for complete search history.

(56) References Cited

U.S. PATENT DOCUMENTS 4,146,973 A * 4/1979 Steffensen ............. F26B 5/047
34/266
5,195,251 A * 3/1993 Gyurcsek ............... F26B 21/02
34/191
(Continued)

FOREIGN PATENT DOCUMENTS

CA 2846731 A1 6/2014
CA 2893777 A1 8/2015
(Continued)

OTHER PUBLICATIONS

Canadian Patent Application No. 2,893,777 Office Action dated Jan. 15, 2016, 4 pages.
(Continued)

*Primary Examiner* — Kavel Singh
(74) *Attorney, Agent, or Firm* — Schwabe Williamson & Wyatt, P.C.

(57) ABSTRACT

Embodiments provide a conveyor for conveying loads of lumber through a lumber kiln or other structure without the use of lumber carts or pushers. The conveyor may include a plurality of rollers arranged to form a flow path through the lumber kiln. Groups of the rollers may be driven by separate drives that are configured to rotate the rollers in opposite rotary directions and/or at variable speeds. Some or all of the drives may be operable independently of the other drives to transport loads of lumber at different speeds/directions in adjacent areas of the lumber kiln. In the event of a fire or a shut-down, the rollers in the proximal half of the kiln and those in the distal half of the kiln can be rotated in opposite directions to evacuate loads quickly from both ends.

30 Claims, 21 Drawing Sheets

(51) Int. Cl.
    *B65G 13/02*     (2006.01)
    *B65G 47/26*     (2006.01)
    *F26B 25/00*     (2006.01)
    *F26B 25/10*     (2006.01)
    *F26B 25/20*     (2006.01)
    *F26B 25/22*     (2006.01)
    *F26B 15/12*     (2006.01)
    *F26B 15/14*     (2006.01)
    *F26B 25/06*     (2006.01)

(52) U.S. Cl.
    CPC .............. *F26B 15/14* (2013.01); *F26B 25/06* (2013.01); *F26B 25/10* (2013.01); *F26B 25/20* (2013.01); *F26B 25/22* (2013.01); *F26B 2210/16* (2013.01); *Y10T 29/49828* (2015.01)

(56) References Cited

U.S. PATENT DOCUMENTS 5,671,633 A * 9/1997 Wagner ................ G01N 27/223
                                            324/688

8,887,897 B2 * 11/2014 Itoh ........................ B65G 43/00
                                            198/781.05
2004/0003982 A1    1/2004   Tachibana
2004/0144623 A1    7/2004   Newsom et al.
2007/0044341 A1    3/2007   Pollard
2012/0227276 A1    9/2012   Tinsley et al.

FOREIGN PATENT DOCUMENTS

EP           0122902 A2    10/1984
JP         2004-299850 A    10/2004

OTHER PUBLICATIONS

PCT/US2015/033821 International Search Report and Written Opinion dated Oct. 28, 2015, 41 pages.
Canadian Patent Application No. 2,893,777 Office Action dated May 26, 2016, 3 pages.
Canadian Examiner's Report for CA 2,893,777, mailed Sep. 8, 2015.

* cited by examiner

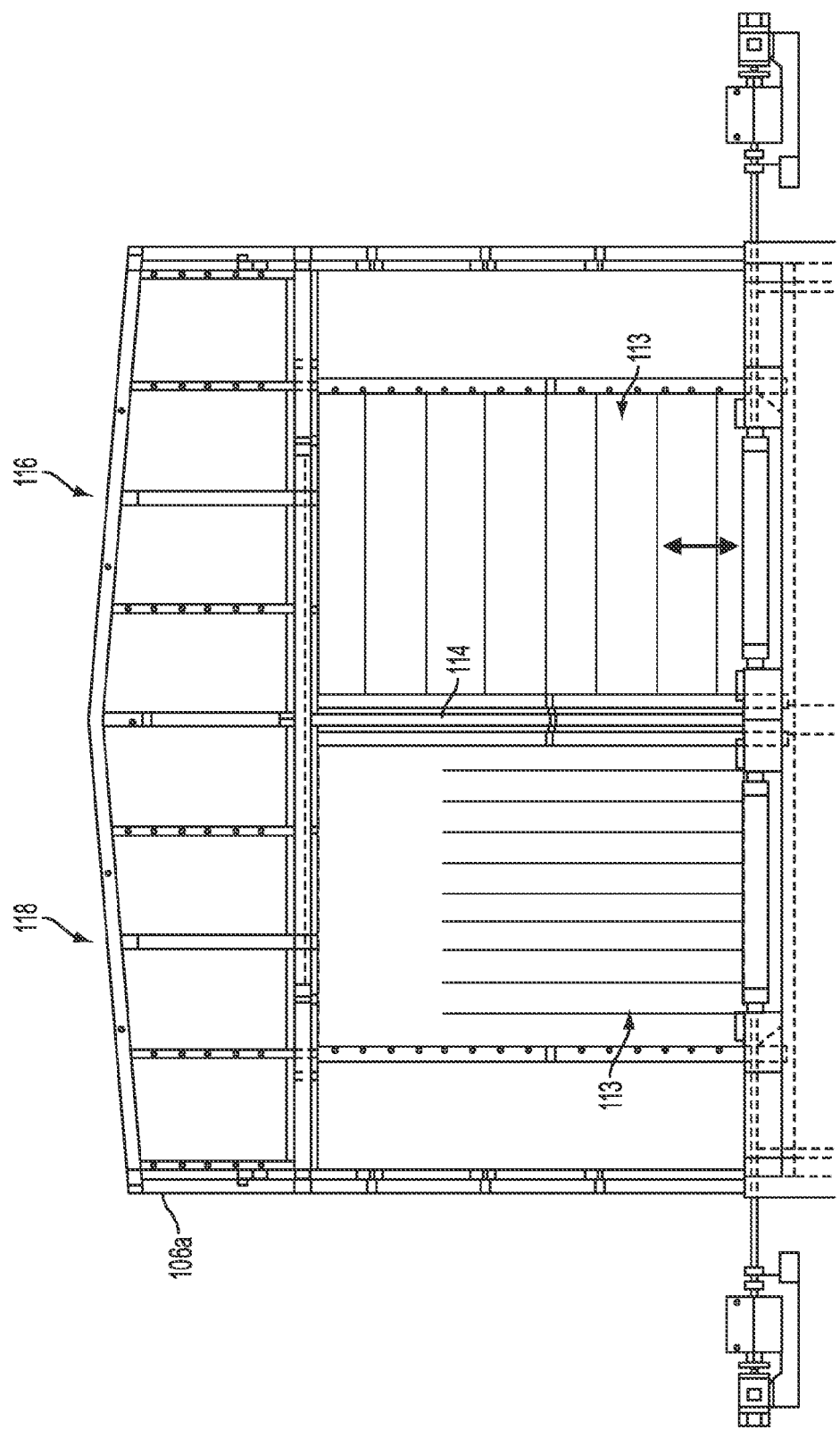

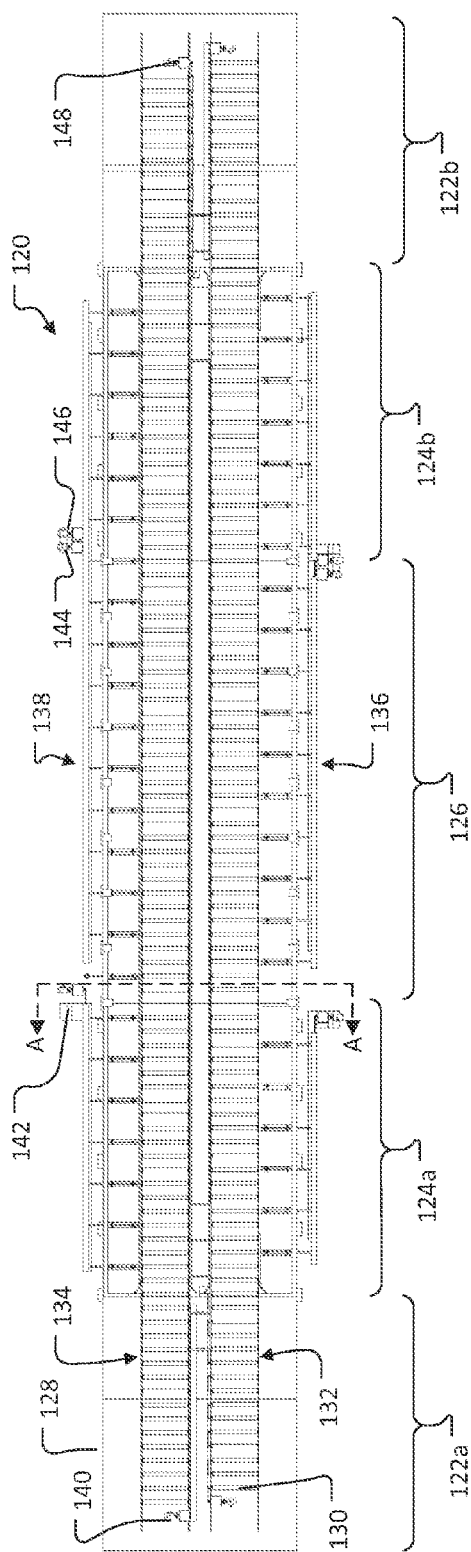
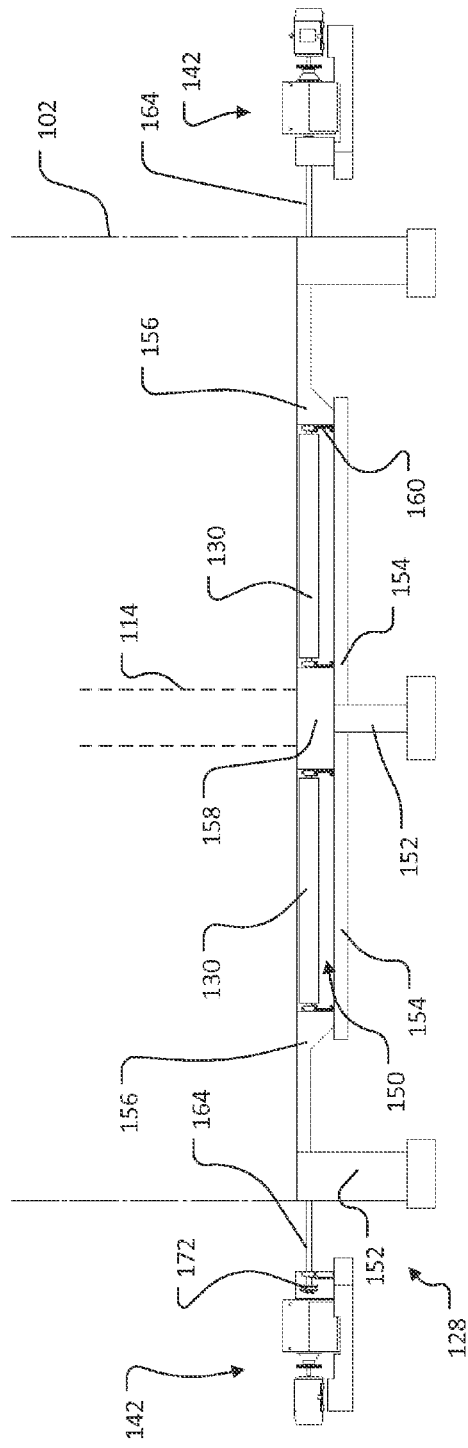
FIGURE 3A
FIGURE 3B

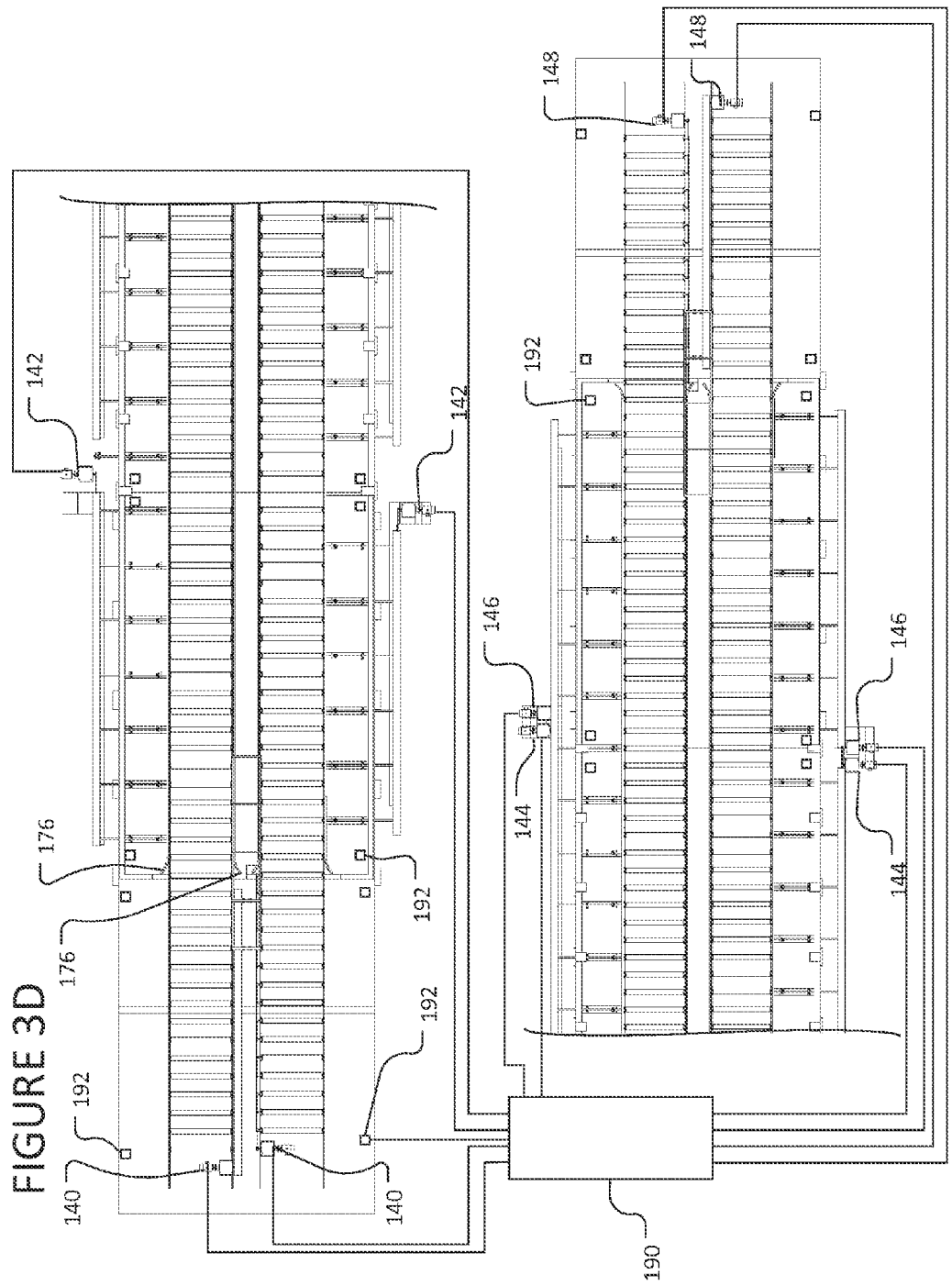

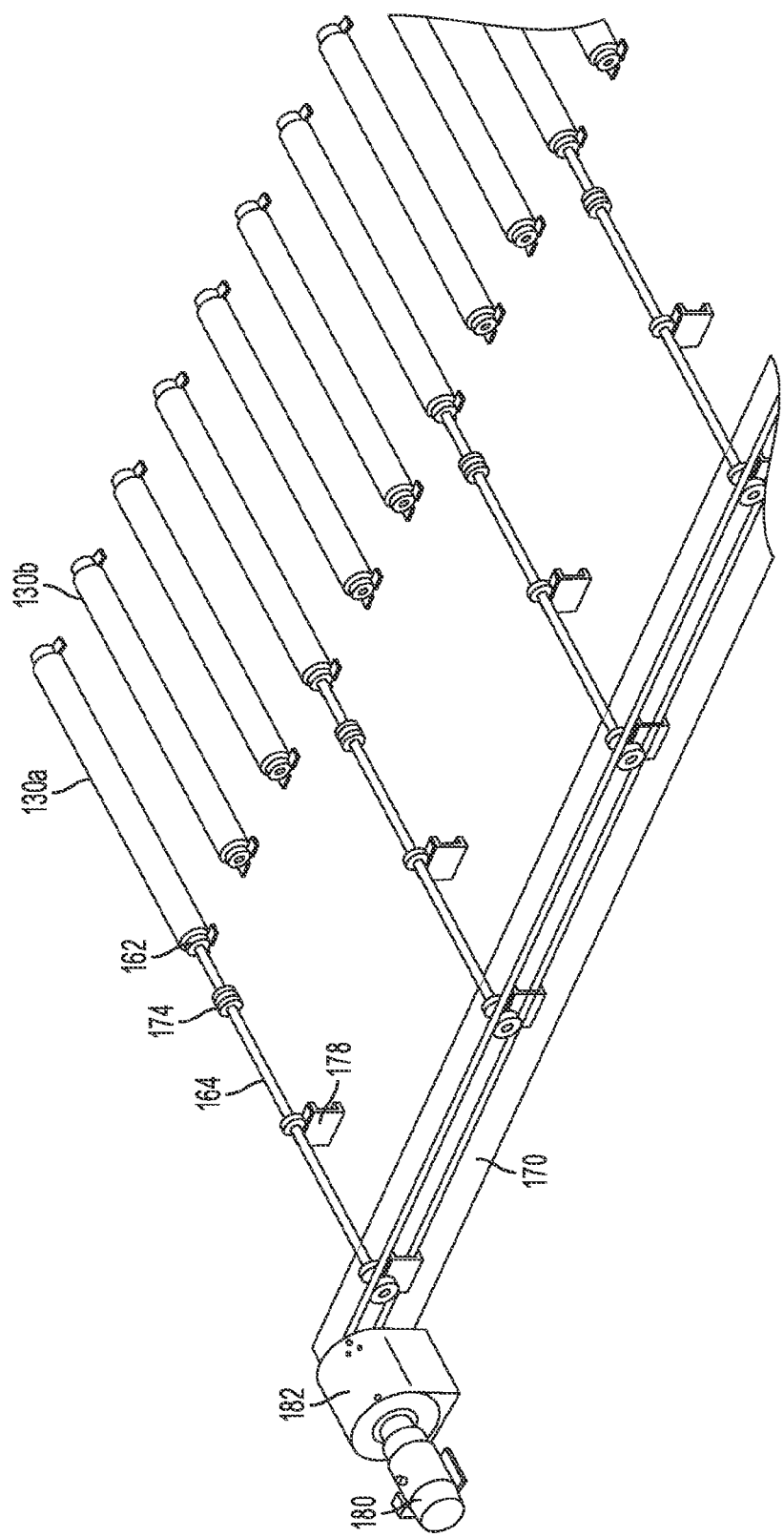

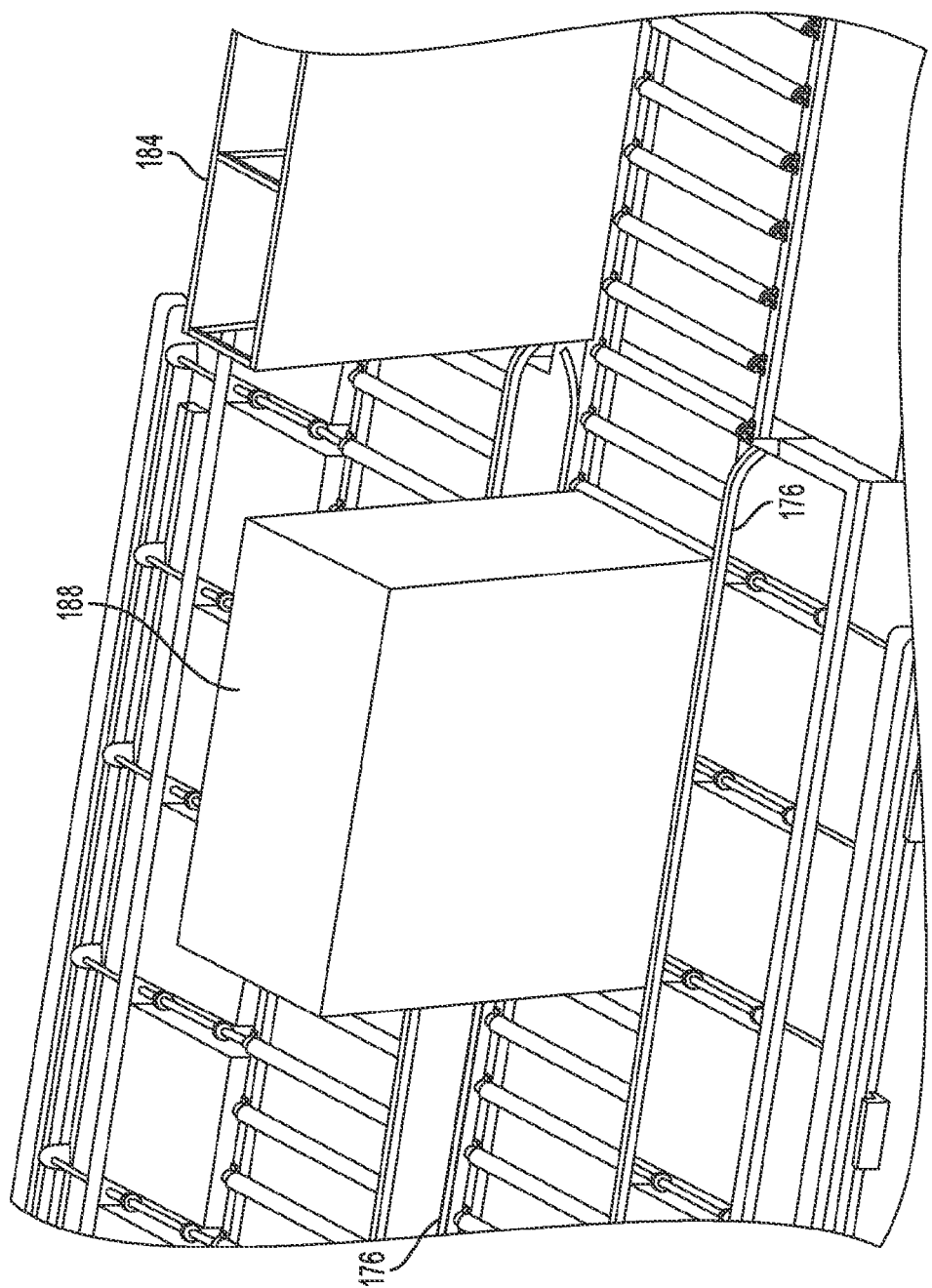

LUMBER KILN CONVEYOR SYSTEM

CROSS-REFERENCE TO RELATED APPLICATIONS

This application claims the benefit of U.S. Provisional Application No. 62/007,153, filed Jun. 3, 2014 and U.S. Provisional Application No. 62/141,389, filed Apr. 1, 2015, the entire disclosures of which are hereby incorporated by reference.

BACKGROUND

Green lumber is typically dried under controlled conditions in a lumber kiln. While batch-type kilns are still widely used, a number of sawmills have upgraded to continuous flow kilns. A conventional continuous flow kiln is an elongate chamber with charge portals at opposite ends and rails that extend through the kiln and the charge portals. Green lumber is stacked onto carts outside of the kiln, and the loaded carts ("charges") are moved end-to-end through the kiln along the rails.

Motive force to move the charges through the kiln is provided by a hydraulic or electric pusher. The pusher pushes a charge toward the entrance of the kiln and into contact with the lagging end of the series of charges. This advances the downstream charges a corresponding distance along the track toward the exit. As each successive charge is pushed into the entrance of the kiln, a downstream-most charge is advanced from the kiln through the exit at the opposite end. Some continuous kilns have only one track and one pusher, while others have a pair of parallel tracks and a corresponding pusher along each track.

Continuous flow kilns are relatively efficient in terms of energy costs and drying speed, and they can hold relatively large volumes of lumber. But like other lumber kilns, continuous flow kilns (and the lumber within) are vulnerable to interior fires and can thus be more difficult and/or expensive to insure.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 2A-2B illustrate front and rear elevational views, respectively, of a lumber kiln with a conveyor system;

FIG. 3A illustrates a plan view of a conveyor system;

FIG. 3B illustrates a sectional view taken along lines A-A of FIG. 3A;

FIG. 3D illustrates a plan view of a conveyor system with a control system;

FIG. 5 illustrates a partial perspective view of a drive system;

FIG. 8 illustrates a partial perspective view of a conveyor system with an alignment guide;

DETAILED DESCRIPTION OF DISCLOSED EMBODIMENTS

Figure 1:
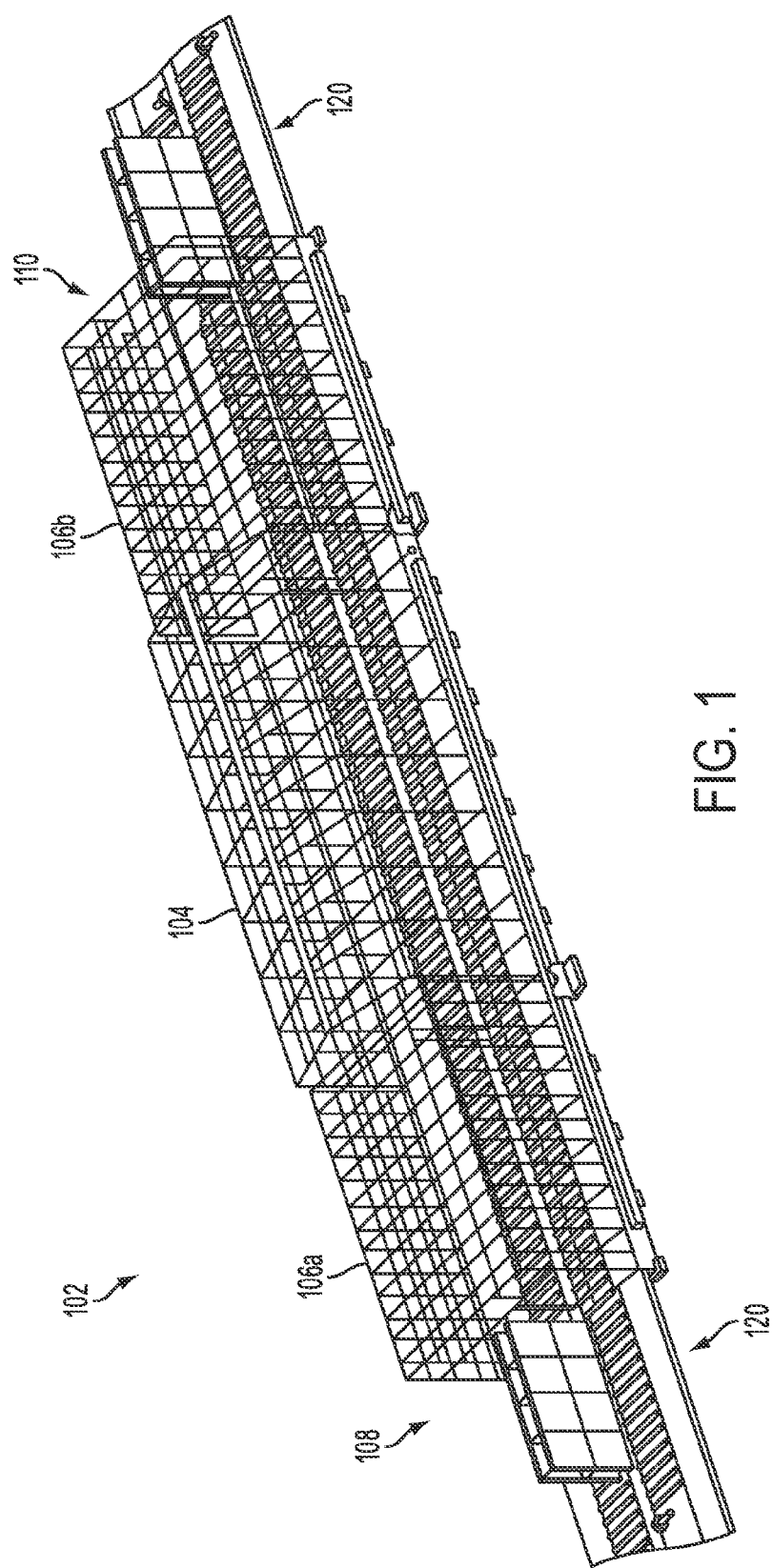
FIG. 1 illustrates a perspective view of a lumber kiln with a conveyor system.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In exemplary embodiments, a computing device may be endowed with one or more components of the disclosed apparatuses and/or systems and may be employed to perform one or more methods as disclosed herein.

The present disclosure describes embodiments of systems, apparatuses, and methods for conveying lumber through a kiln. In particular, the present disclosure describes embodiments of a powered roller conveyor system configured to convey loads of lumber along a path of flow. In various embodiments, a powered roller conveyor system may be selectively operable to convey lumber at variable speeds and/or in two or more directions (e.g., forward and reverse) along the path of flow. In some embodiments, the powered roller conveyor may be coupled with a continuous flow (CF) lumber kiln.

In conventional CF lumber kiln systems, loads of lumber are transported on kiln carts that are mounted on rails. Typically, one set of rails passes through one side of the kiln and another set of rails passes through the opposite side of the kiln. Loaded kiln carts are pushed end-to-end through the kiln along one track in one direction while other carts are pushed end-to-end through the kiln along the other track in the opposite direction. The middle section of the kiln is heated and the opposite ends are preheating/cooling sections. In each preheating/cooling section, dried lumber moving away from the middle section on one side is being cooled/conditioned while green lumber moving toward the middle section on the other side is being preheated.

The loaded kiln carts are pushed by a pusher device that is typically located outside of the kiln. The pusher device pushes a cart into the entrance of the kiln and into contact with the line of carts. As the force exerted by the pusher against the cart is transferred to the line of carts downstream, the entire line is advanced along the rails. When the pusher pushes the next cart into the entrance, the entire line of carts is advanced again. To remove a particular cart, the operator can push other carts into the entrance, or use a winch or other such device to tow individual carts from the kiln, until the desired cart emerges. If the kiln must be emptied quickly, and if the carts are chained together, the entire line of carts may be pulled from one end of the kiln by a front end loader or other truck/tractor with a steel rope. But this cannot be done unless the carts are chained together and there is sufficient open space in front or behind the kiln for the loader/tractor to pull the line of carts from the kiln. As such, this method is not practical in mills with space constraints. It is also not possible to pull from opposite ends at the same time. Thus, such systems do not provide a mechanism for emptying the kiln quickly from both ends in the event of a fire or other emergency, or for a planned shut-down.

In various embodiments, a roller conveyor system may be configured to convey loads of lumber through a lumber kiln, such as a CF kiln, at variable speeds. The conveyor system may have multiple conveyor sections, each with a plurality of rollers arranged to collectively form a transport surface. The rollers may be driven by a drive system to convey the loads through the lumber kiln without carts, rails, or pusher devices.

The conveyor sections may be positioned end to end to form a continuous conveyor that extends through the lumber kiln. Some of the conveyor sections may be disposed within a corresponding zone of the lumber kiln, such as a heating zone or a preheating/cooling zone. Other conveyor sections may be positioned outside of the lumber kiln at opposite ends thereof. Each conveyor section may be controlled independently of the other conveyor sections, allowing the rollers of each conveyor section to be driven at different speeds and/or in different directions that the rollers of an adjacent conveyor section. Optionally, some of the conveyor sections may have "active" rollers that are operatively coupled with a corresponding drive and "passive" rollers that are not operatively coupled with the drive.

In some embodiments, the rollers may be positioned along opposite sides of each conveyor section to form two generally parallel flow paths, and the rollers on each side of each conveyor section may be controlled separately. Thus, the rollers on one side of a conveyor section may be selectively driven as a unit, independently of the rollers on the opposite side and/or in other zones. This may allow the rollers on one side of a zone/conveyor section to be driven at a different rotational speed and/or a different rotary direction than the in adjacent zones or on the opposite side of that zone/conveyor section.

In other embodiments, a roller conveyor system may be configured to convey loads of lumber through another type of lumber kiln. For example, a batch-type kiln with a single chamber and one or more doors in one wall of the kiln may be modified by adding a roller conveyor system to move lumber into the kiln and out of the kiln through the one or more doors. Similarly, such a batch-type kiln may be modified by adding another one or more doors in an opposite wall of the kiln and adding a roller conveyor system to transport lumber into the kiln through the door(s) on one side and subsequently through the door(s) on the other side. Optionally, one or more chambers may be also be added to one or both of the sides of the batch-type kiln, and the roller conveyor system may extend through the additional chamber(s) and through the pre-existing kiln. In any case, the roller conveyor system may have two or more groups of rollers configured to be driven independently of one another, and the groups of rollers may be positioned along a single flow path or along different flow paths that extend through the kiln.

In some embodiments, the conveyor system may further include a control system operatively coupled with the drive system and configured to control the drives. Optionally, the conveyor system may be operatively coupled with one or more sensors disposed on or within the lumber kiln. The control system may be configured to automatically adjust the speed/rotational direction of the rollers based on data from the sensors. For example, the sensor(s) may be configured to detect a fire within the lumber kiln, and the control system may be configured to respond by adjusting the speed and rotational direction of the rollers to evacuate loads from both ends of the lumber kiln. In various embodiments, the control system may include a manual input such as one or more switches/buttons. The manual input may be operable, upon actuation by an operator, to cause the conveyor system to adjust operation of the drives (e.g., to evacuate loads from both ends of the lumber kiln, to resume normal operation, to change rotational speed/direction of a group of rollers, etc.).

Embodiments of conveyor systems as described herein may provide several advantages over prior kiln cart systems. The independently controlled roller sections may allow lumber to be evacuated from the kiln more rapidly than is possible in conventional systems. The ability to run loads of lumber out of the kiln may also facilitate planned shut downs of the kiln. Similarly, the rollers may be used to create gaps between loads to facilitate emergency operations, planned maintenance, or other operations in one part of the lumber kiln while other parts of the lumber kiln remain in use.

In addition, such conveyor systems may be operable to convey loads in sizes and/or combinations that cannot be accommodated efficiently with conventional kiln cart systems. For example, embodiments of conveyor systems described herein may accommodate greater variability in lumber dimensions, drying times, and load combinations than fixed kiln carts.

While embodiments of a powered roller conveyor system are described herein with reference to lumber kilns, these examples are provided by way of illustration and are not intended to be limiting. Such conveyor systems may also be provided for use to convey lumber in other environments, such as in a storage facility (e.g., a warehouse), a transport facility (e.g., a ship or a rail yard), or a sawmill. Such uses and combinations are specifically contemplated and encompassed by the present disclosure.

Figure 2A:
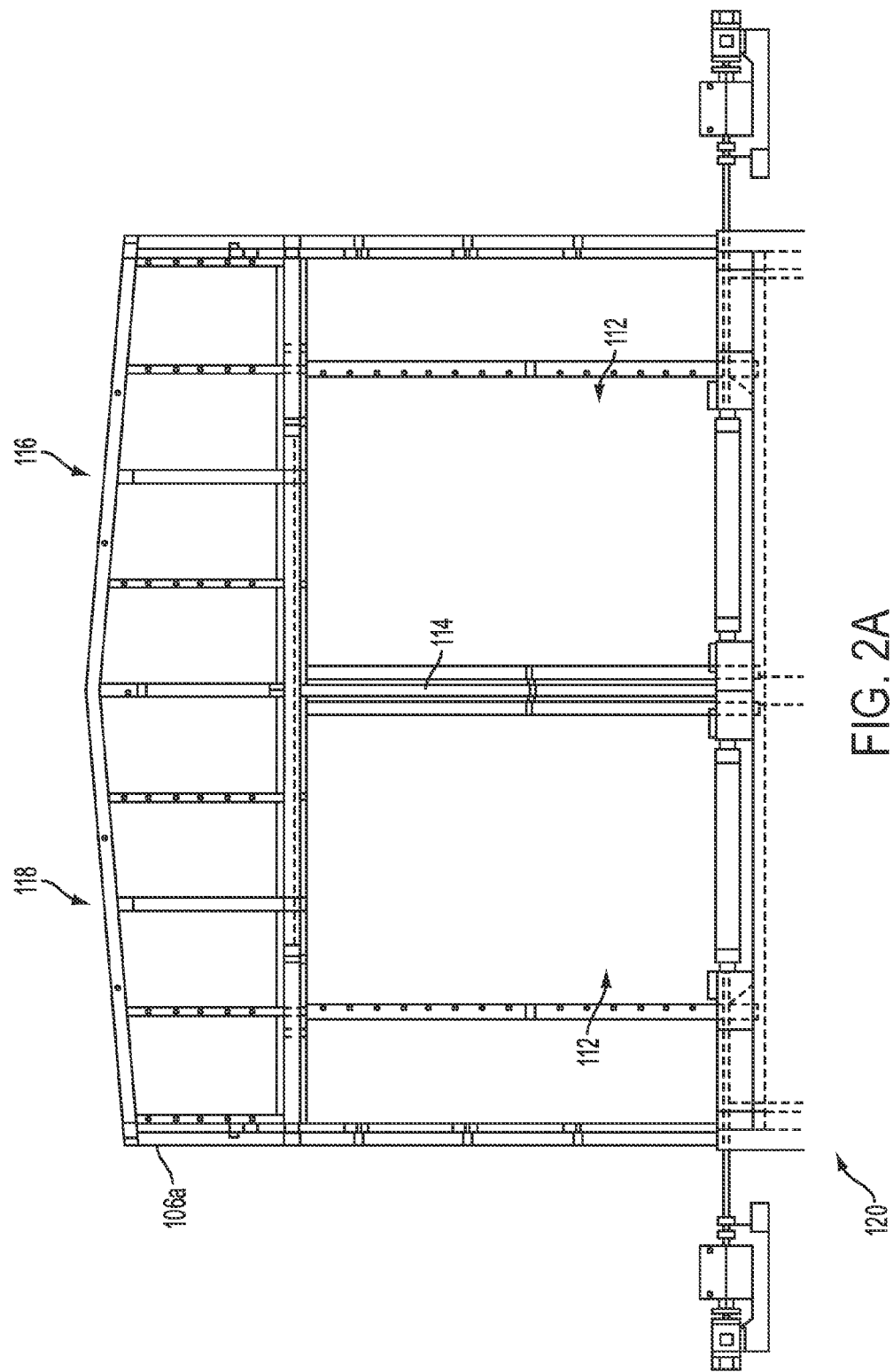

FIGS. 1 and 2A-2B illustrate a perspective view and front and rear elevational views, respectively, of a kiln system 100 in accordance with various embodiments.

Referring first to FIG. 1, kiln system 100 may include an elongate enclosure 102 and a conveyor system 120 that extends at least partially through elongate enclosure 102. In some embodiments, kiln system 100 may be a lumber drying system, and elongate enclosure 102 may be a lumber kiln or some portion thereof. For example, elongate enclosure 102 may be a continuous flow (CF) kiln, with two paths of flow passing in opposite directions through opposite sides of the kiln. In other embodiments, elongate enclosure 102 may be a batch-type kiln. In still other embodiments, elongate enclosure 102 may be another type of kiln.

Elongate enclosure 102 may include a main chamber 104. In some embodiments, elongate enclosure 102 may further include two secondary chambers 106 disposed at generally opposite ends of main chamber 104. In other embodiments, elongate enclosure 102 may lack one or both of secondary chambers 106. Elongate enclosure 102 may have a first end 108 and a generally opposite second end 110. One or both of the ends 108/110 may have one or more portals 112 through which lumber loads may be conveyed. In some embodiments, one or more of the portals 112 may include an insulating member 113 configured to at least partially block airflow through that portal 112 (see e.g., FIG. 2B) Examples of insulating members include, but are not limited to, doors (e.g., doors that swing outwardly, doors that swing upwardly, doors that slide laterally or vertically, doors that roll up or laterally) and curtains (e.g., flexible panel curtains, strip curtains, laterally or vertically sliding/rolling curtains, an air curtain). Optionally, an insulating member may be selectively actuable to open and close the corresponding portal. Alternatively, an insulating member may be configured to be pushed aside by a passing load of lumber. In some embodiments, one or more portals 112 at a distal end of elongate chamber 102 (e.g., between main chamber 104 and secondary chamber 106b, at a distal end of main chamber 104, or in a wall of secondary chamber 106b) may be provided with a corresponding insulating member 113. Other embodiments may lack insulating members 113. Still other embodiments may lack a portals 112 at a distal end of elongate enclosure 102.

Optionally, main chamber 104 may be provided with burners, heated air, or other source(s) of heat, and/or a plurality of fans configured to direct airflow within elongate enclosure 102. Thus, in some embodiments main chamber 104 may be a heating zone and secondary chambers 106a and 106b may be preheating/cooling zones.

As shown for example in FIGS. 2A-2B, in some embodiments elongate enclosure 102 may include a center baffle 114 disposed longitudinally through some or all of chambers 104/106a/106b. Center baffle 112 may divide elongate enclosure 102 into generally opposite sides 116 and 118. Other embodiments may lack center baffle 114. Still other embodiments may include additional interior baffles, walls, or other insulating structures within or between any of chambers 104/106a/106b.

Figure 3C:
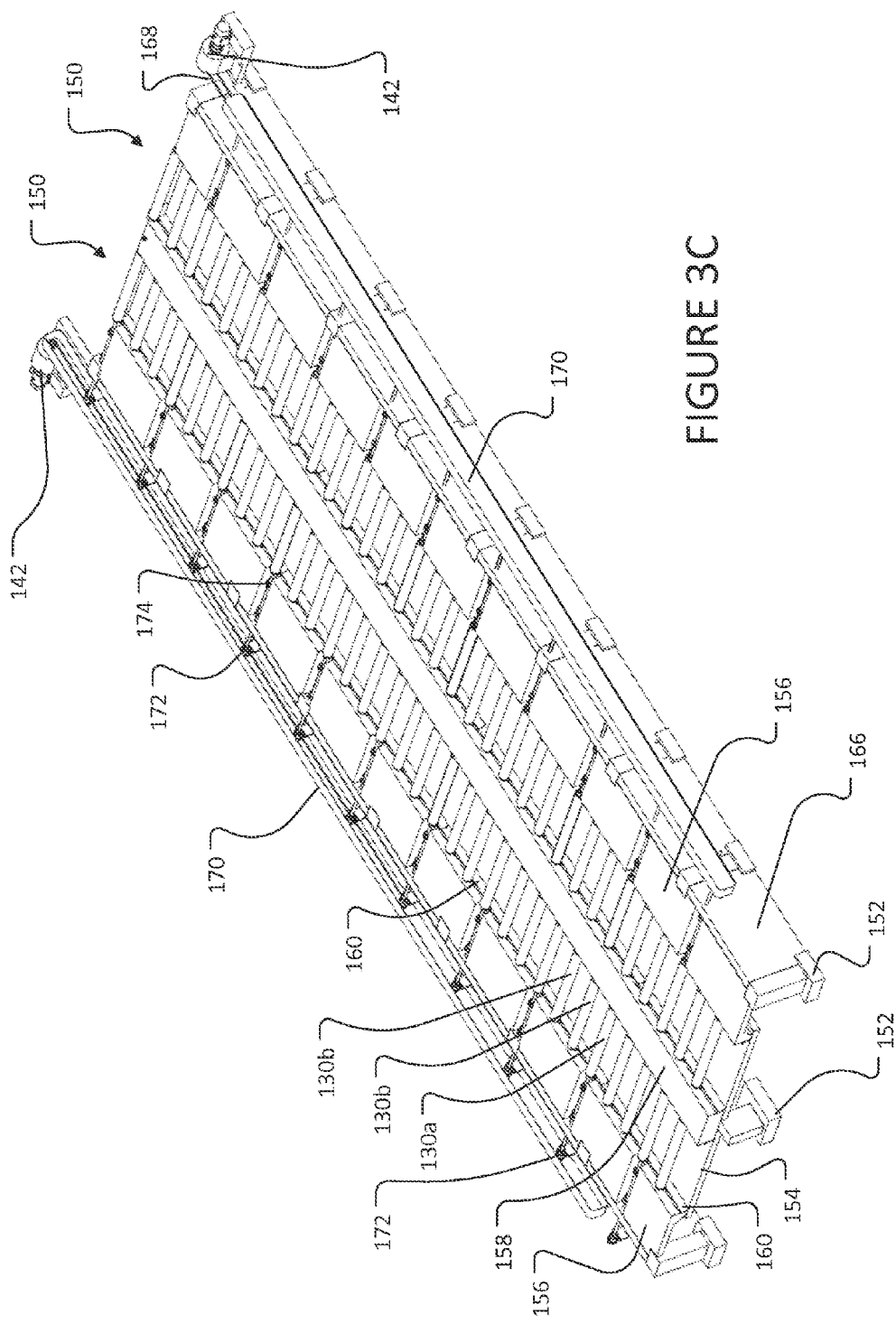
FIG. 3C illustrates a partial perspective view of a lumber kiln with a conveyor system.

FIG. 3A illustrates a plan view of a conveyor system and features thereof, in accordance with various embodiments. FIG. 3B illustrates a sectional view taken along lines A-A of FIG. 3A. FIG. 3C illustrates a perspective view of a portion of a conveyor system. FIG. 3D illustrates a view of a conveyor system with a control system, in accordance with various embodiments.

In various embodiments, a conveyor system may include two or more conveyor sections with corresponding groups of rollers and drives. For example, as illustrated in FIG. 3A, conveyor system 120 may include a main section 126, two secondary sections 124a and 124b, and two loading sections 122a and 122b. Main section 126 may be disposed generally within main chamber 104, and secondary sections 124a and 124b may be disposed generally within secondary chambers 106a and 106b, respectively. Loading sections 122a and 122b may be disposed outside of elongate structure 102 at opposite ends 108 and 110, respectively. Other embodiments may lack any one or more of these sections. For example, some embodiments may lack one or both of secondary section(s) 124a and 124b. Other embodiments may include only main section 126 and loading section 122a. Still other embodiments may include additional loading sections between loading section 122a/122b and a source of green lumber, such as a stacker or a storage area, or a desired destination for dried lumber, such as a freight loading area or a storage facility.

Conveyor system 120 may further include a floor 128. In some embodiments, floor 128 may be or may include a portion of a pre-existing foundation. For example, in some embodiments elongate chamber 102 may be a pre-existing lumber kiln disposed on a cement pad, and floor 128 may be the cement pad. Optionally, floor 128 may be formed by removing and/or otherwise modifying a portion of the pre-existing foundation, as described in further detail below.

Conveyor sections 122a, 124a, 126, 124b, and 122b may each have a corresponding plurality of rollers 130. Collectively, rollers 130 of the conveyor sections may form a support surface that extends through elongate enclosure 102. Rollers 130 may be arranged with their axes of rotation generally parallel to one another and generally perpendicular to a longitudinal axis of elongate enclosure 102 and/or a longitudinal axis of floor 128. Collectively, rollers 130 may define one or more flow paths that extend longitudinally through elongate enclosure 102.

In various embodiments, rollers 130 may define two generally parallel paths of flow. The paths of flow may extend through elongate enclosure 102 on opposite sides. In some embodiments, the paths of flow may begin and end outside of, and at opposite ends of, elongate enclosure 102. In other embodiments, rollers 130 may define a single path of flow that extends through elongate enclosure 102 from a proximal end to a distal end of elongate enclosure 102.

Figure 13A:
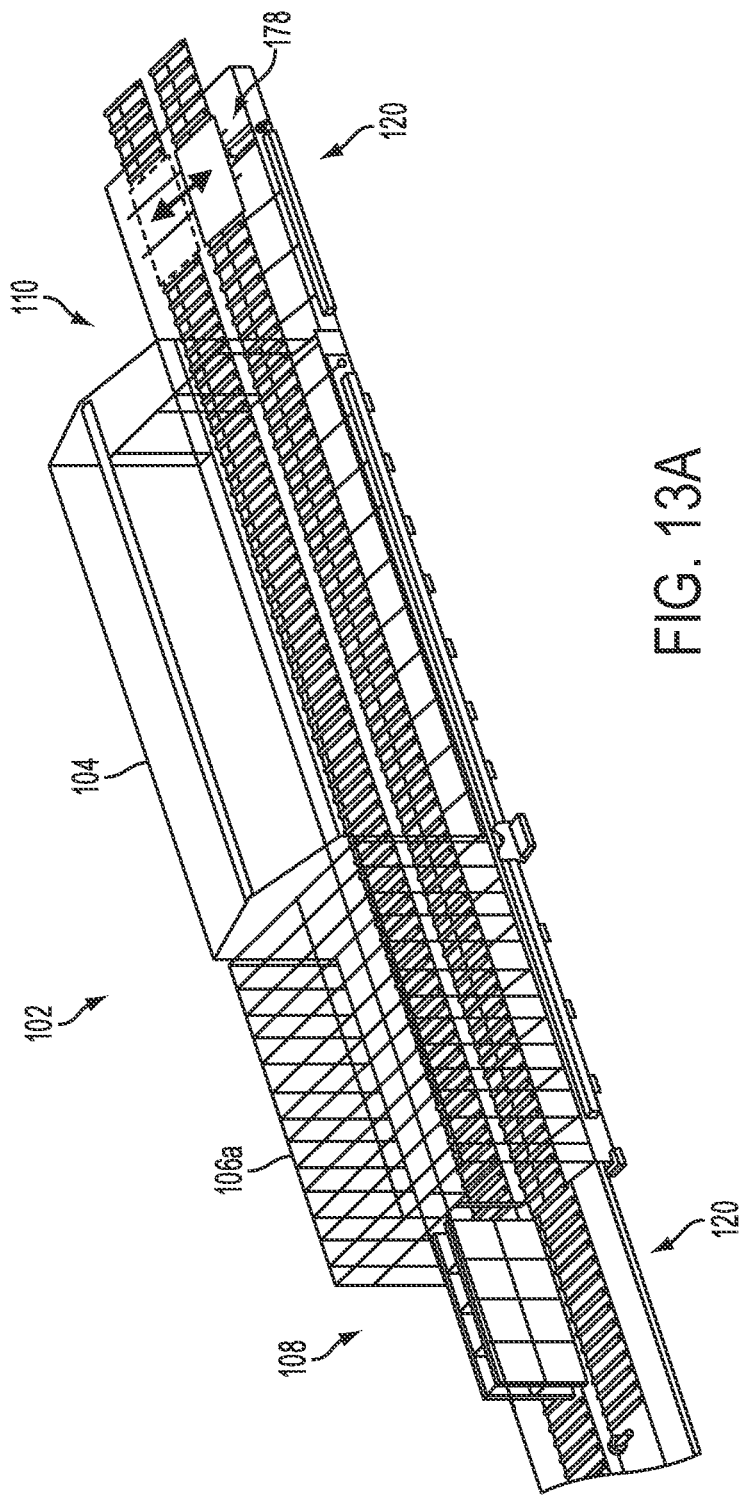
FIGS. 13A-D illustrate perspective views of additional embodiments of a lumber kiln with a conveyor system, all in accordance with various embodiments.
Figure 13B:
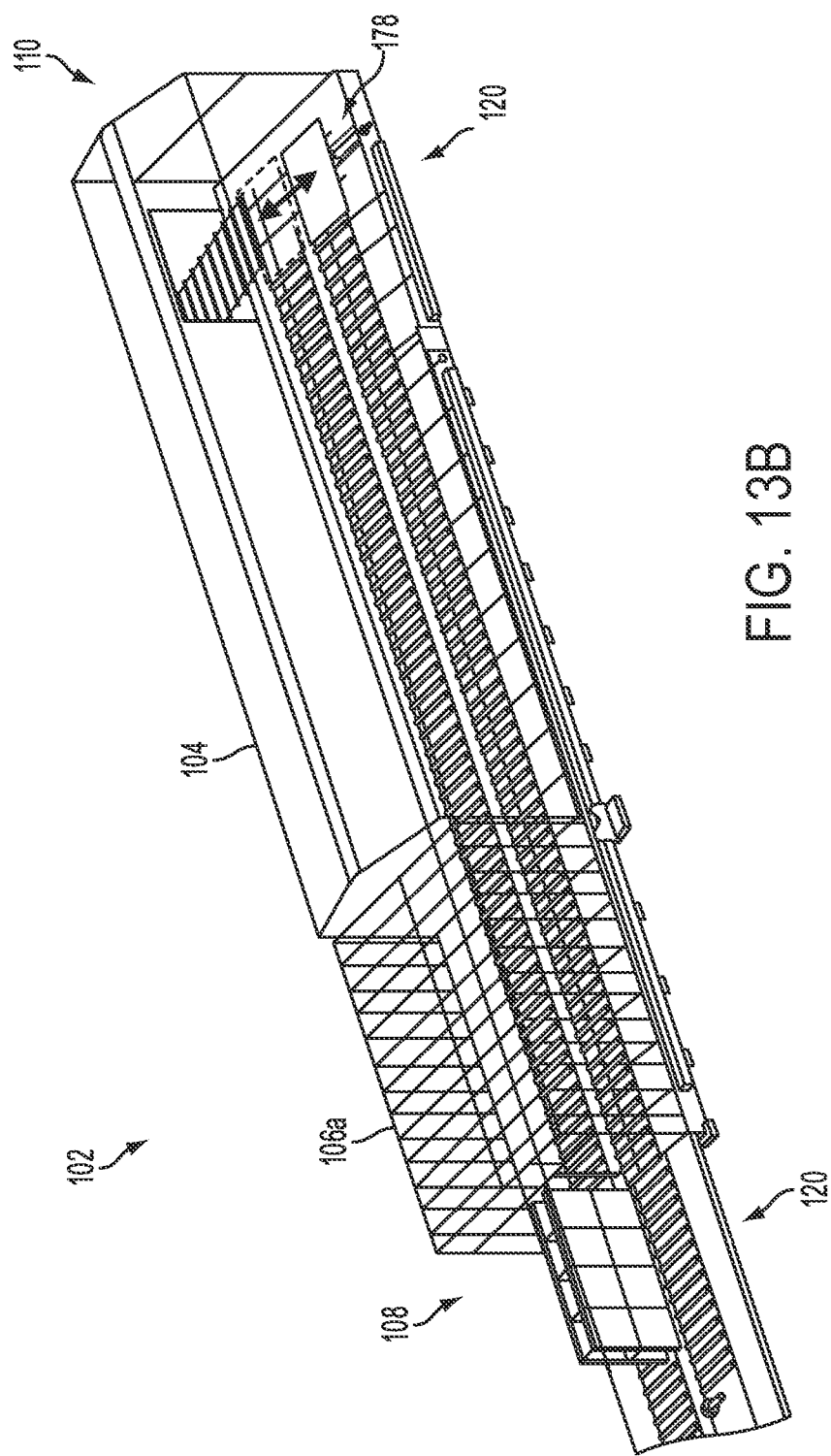
Figure 13C:
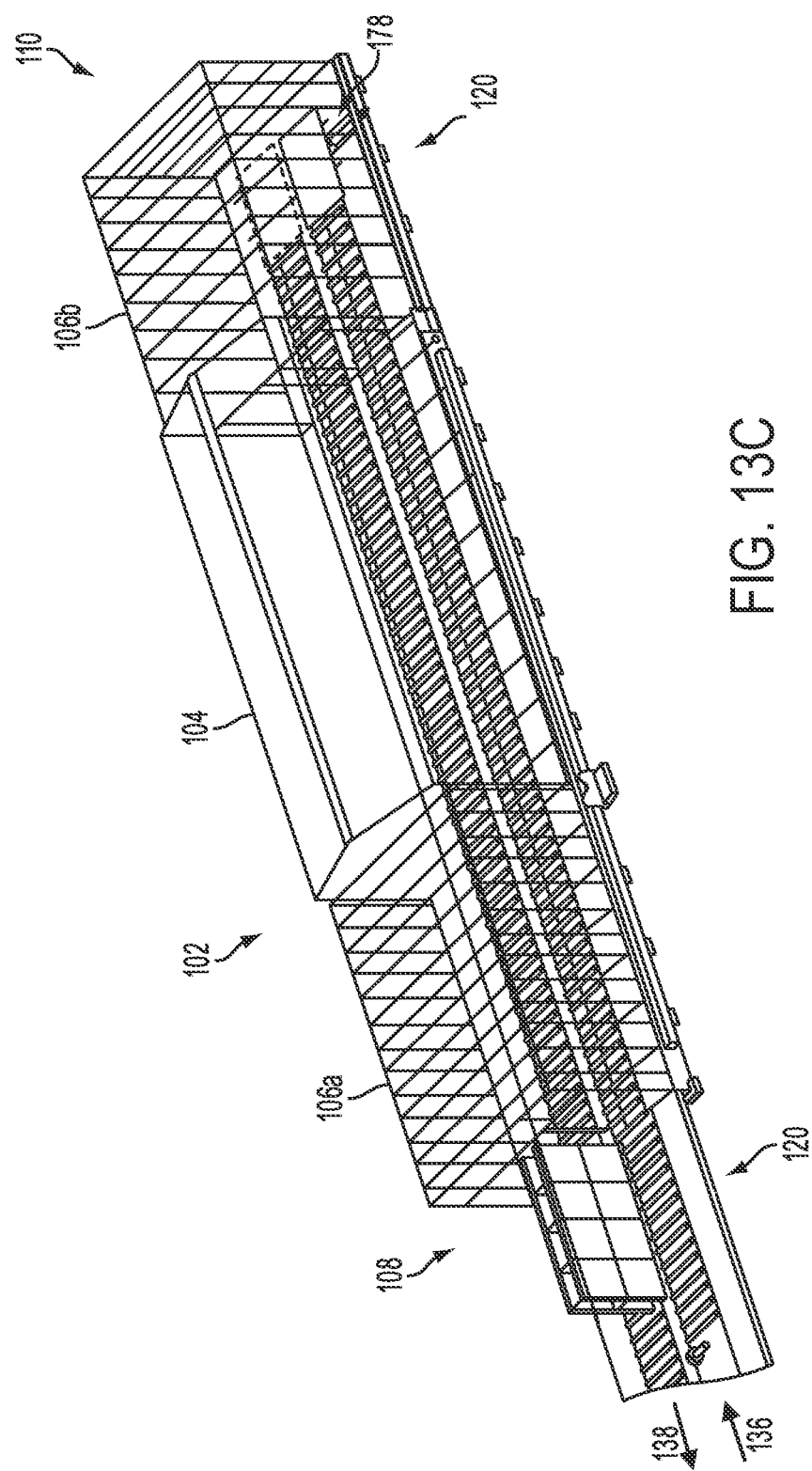
Figure 13D:
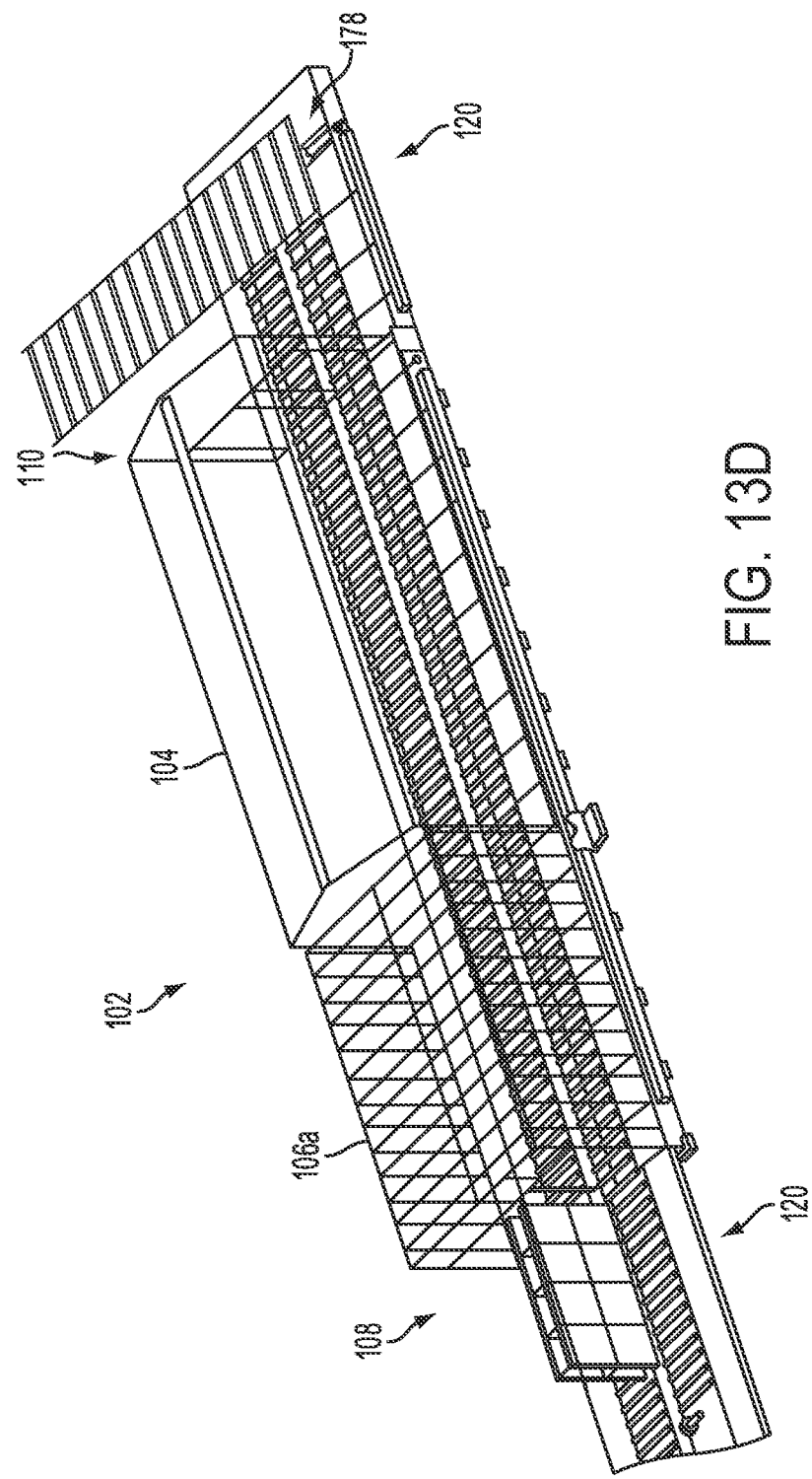

In still other embodiments, as shown for example in FIGS. 13A-13D, rollers 130 may define a reciprocal path of flow that extends at least partially through one side of elongate enclosure 102, across the longitudinal centerline of elongate enclosure 102, and through the opposite side of elongate enclosure 102. For example, the reciprocal path of flow may extend through one side of a heated section/zone, across the longitudinal centerline either inside or outside of the elongate enclosure, and then through the opposite side of the heated section/zone. In such embodiments, the reciprocal path of flow may have generally parallel first and second portions disposed on generally opposite sides of the elongate enclosure 102 and a connector portion 178 that extends between the first and second portions (FIGS. 13A-13C). The connector portion 178 may be configured to move a load of lumber from the distal end of the first portion of the reciprocal flow path to the distal end of the second portion. The connector portion 178 may have any suitable configuration. For example, connector portion 178 may include a support movably coupled to a track, and a drive coupled to the platform. The actuator may include, but is not limited to, a hydraulic/pneumatic cylinder, a motor, an engine, or the like. The drive may be selectively operable to move the platform from the first portion to the second portion and vice versa. Alternatively, the drive may be a forklift, a pusher device, or the like. In some embodiments, connector portion 178 may include a set of rollers that are oriented generally perpendicular to the rollers of the first and second portions of the reciprocal path of flow and coupled with a corresponding drive (FIG. 13D). Optionally, an additional set of rollers may be provided proximal to connector portion 178 to form an additional flow path that extends from connector portion 178 and out of the elongate enclosure 102. The additional flow path may pass through another portal 112, which may optionally include a corresponding insulating member 113. The additional set of rollers may allow loads to be moved from the first/second portion(s) of the reciprocal path of flow onto the additional flow path to aid evacuation of loads from the distal end of the elongate enclosure 102. Regardless, a reciprocal path of flow may allow loads of lumber to be conveyed through the heated portion of elongate enclosure 102 twice, in opposite directions, with the loads entering and exiting on opposite sides of one end of elongate enclosure 102. Kilns with reciprocal flow paths are described, for example, in U.S. patent application Ser. No. 14/201,476, the entire disclosure of which is hereby incorporated by reference.

The diameter, length, configuration, spacing, and other characteristics of rollers 130 may vary among embodiments. In some embodiments, rollers 130 may include a hollow cylinder made of steel or other suitable metals/alloys and a hub coupled with each end of the cylinder. The hubs may have a center aperture, and a shaft may be disposed through the center apertures and hollow cylinder. Alternatively, the hubs may be rotatable relative to the hollow cylinder and/or to a mount to allow rotation of the hollow cylinder relative to the mount. In other embodiments, rollers 130 may include solid cylinders, or have any conventional configuration. In various embodiments, rollers 130 may have a diameter of 4-15 inches, or 6-12 inches, or 8-10 inches, or 8-9 inches, or 8.4-8.8 inches. In one example, rollers 130 may have a diameter of 8.6 inches. In other embodiments, rollers 130 may have a diameter of 12-24 inches or 24-48 inches.

Optionally, some or all of rollers 130 and/or components coupled with rollers 130 may be coated with one or more materials configured to inhibit corrosion, cushion loads, deflect heat, and/or reduce slippage of loads against the rollers. Examples of suitable materials include, but are not limited to, epoxies, rubber, polymers/plastics, and other materials known for such uses. In some embodiments, the coating may include a fire-resistant or fire-retardant substance. Coatings may be continuous or discontinuous, and may be applied by spraying, dipping, powder coating, as sheets or sleeves, and/or by any other conventional method.

In various embodiments, each of the conveyor sections may have at least one drive coupled with the rollers. For example, referring again to FIG. 3A, conveyor sections 122a, 124a, 126, 124b, and 122b may be coupled with corresponding drive(s) 140, 142, 144, 146, and 148, respectively. In some embodiments, each of the conveyor sections may have one set of rollers coupled with one drive. In other embodiments, each of the conveyor sections may have two sets of rollers corresponding to two flow paths, and each set of rollers may be coupled with a corresponding drive. In other embodiments, each of the conveyor sections may have one set of rollers corresponding to a single flow path, and each set of rollers may be coupled with a corresponding drive. In still other embodiments, one of the conveyor sections may have two sets of rollers and a connector portion 178 that correspond to portions of a reciprocal path of flow, and the sets of rollers and the connector portion 178 may be coupled with corresponding drives. Optionally, a conveyor section may have two or more drives, and each of the drives may be operatively coupled to some of the rollers of that conveyor section. Collectively, the drives of each of the conveyor sections may be a drive system or part of a drive system.

In some embodiments, rollers 130 may be arranged along opposite sides of sections 122a, 124a, 126, 124b, and 122b to form two flow paths 132 and 134. In other embodiments, rollers 130 may be arranged in one row to form a single flow path, or in three or more rows to form three or more flow paths. For example, as in the illustrated embodiment, the conveyor sections may define a first flow path 136 that extends through one side of elongate enclosure 102 and a second flow path 138 that extends through the opposite side of elongate enclosure 102. Alternatively, in other embodiments rollers 130 may define only one flow path or more than two flow paths.

Referring now to FIG. 3B, the rollers may be coupled with floor 128. Floor 128 may include one or more longitudinal channel(s) 150. In some embodiments, channel(s) 150 may be formed in an existing floor/foundation, such as a concrete pad, by removing material from the existing floor/foundation. Optionally, forming the channel(s) 150 may also include removing one or more rails and/or a pusher device from the existing floor/foundation. In other embodiments, floor 128 may include a generally horizontal pad 154 and longitudinal side baffles 156 disposed along each side of pad 154. Thus, the vertical sides and bottom of channel 150 may be formed by the vertical sides of longitudinal supports 156 and the upper surface of pad 154, respectively. Alternatively, a longitudinal center baffle 158 may be disposed on pad 154 between the longitudinal side baffles 156, forming two channels 150 on opposite sides of the longitudinal center baffle 158. In some embodiments, longitudinal side baffles 156, longitudinal center baffle 158, and/or pad 154 may be supported on one or more footers 152.

Optionally, one or more support beams 160 may be provided along one or both of the vertical sides of channel(s) 150. Support beam 160 may be used to support rollers 130 and/or to aid the positioning of rollers 130 within a generally horizontal plane, such that rollers 130 form a generally horizontal transport surface. In some embodiments, some or all of rollers 130 may be coupled with a retaining member 162 at one end. Optionally, the opposite ends of rollers 130 may also be coupled with another retaining member 162. In some embodiments, rollers 130 may be rotatably coupled with retaining members 162 (see FIGS. 4 and 5). Retaining members 162 may be fixedly or rigidly coupled with support beam 160. Alternatively, retaining members 162 may be fixedly or rigidly coupled to some other portion of floor 128. Some embodiments may lack retaining members 162 and/or support beam 160. Other embodiments may include conventional component(s) in configurations suitable to support and/or aid the positioning of rollers 130. Such components and configurations are known in the art and are not described further herein.

Rollers 130 may be mounted within channel(s) 150 in a transverse orientation to form a transport surface. In some embodiments, rollers 130 may be positioned such that the top surfaces of rollers 130 and the top surfaces of side baffles 156 and/or center baffle 158 are substantially aligned. The arrangement of rollers 130 in channel(s) 150 may aid the drying of lumber by helping to guide airflow toward the lower portions of the loads of lumber.

Rollers 130 may be mounted within channel(s) 150 at regular intervals. In some embodiments, the distance between intervals may be a function of roller diameter, expected load sizes, and/or other factors. For example, rollers with smaller diameters and/or rollers for use with shorter loads may be spaced more closely together than larger rollers and/or rollers for use with longer loads. In some embodiments, rollers 130 may be spaced apart at intervals (distance between axes of rotation) of 1-10 inches, 10-20 inches, 20-30 inches, 30-40 inches, 25-35 inches, 28-32 inches, or 30 inches. Alternatively, rollers 130 with relatively large diameters may be spaced apart at larger intervals, such as 40-60 inches or 60-80 inches. At least some of rollers 130 may be coupled with a corresponding shaft 164, which may in turn be coupled with a corresponding drive (e.g., drive 140, 142, 144, 146, or 148). As best shown in FIG. 3C, shafts 164 may be disposed through some portion of the corresponding longitudinal side baffle 156. Each shaft 164 may have a corresponding drive coupler 172, such as a sprocket or the like. The drive couplers 172 may be coupled with the corresponding drive by a drive assembly 168, such as one or more chains, belts, or the like. For example, the drive couplers 172 may have double sprockets, and the drive assembly 168 may include a plurality of drive chains. One of the drive chains may connect the corresponding drive to the first of the sprockets on a first drive coupler 172. Another one of the drive chains may connect the second of the two sprockets to a corresponding second sprocket on the next adjacent drive coupler 172. A third one of the drive chains may connect the remaining first sprocket to the first sprocket of the next drive coupler 172, and so on, to operatively couple multiple shafts 164 with the corresponding drive (see e.g., FIG. 6). In other embodiments, each of the drive couplers 172 may be individually coupled with the corresponding drive by a chain or belt. Alternatively, a group of shafts 164 may be coupled with a corresponding drive by a single chain or belt, by multiple chains/belts in various other configurations, or in any conventional manner. In some embodiments, each shaft may be coupled with a separate drive, or each two or three shafts may be coupled with a separate drive, such that a conveyor section has multiple drives on one or both sides.

Optionally, one or more of the conveyor sections may have active rollers 130a and passive rollers 130b. For example, active rollers 130a may be positioned at intervals along a channel 150, and one or more passive rollers 130b may be mounted between adjacent ones of the active rollers 130. The passive rollers 130b may be rotatably mounted within channel 150. Passive rollers 130b may lack drive couplers 172 or any other means of engaging the corresponding drive. Thus, passive rollers 130 may be freely rotatable but not driven. As such, the drives may drive the active rollers 130a without driving the passive rollers 130b.

Other embodiments may lack passive rollers 130b. Alternatively, one or more of the conveyor sections may have both active rollers 130a and passive rollers 130b, and another one or more of the conveyor sections may have only active rollers 130a. For example, the main section 126 and the secondary sections 124a and 124b may have both active rollers 130a and passive rollers 130b, and loading sections 122a and 122b may have fewer or no passive rollers 130b. Similarly, conveyor sections may have different numbers/ spacing/arrangements of passive rollers 130b relative to active rollers 103a. For example, main section 126 may have one or two passive rollers 130b between adjacent active rollers 130a, and loading sections 122a and 122b may have fewer or no passive rollers 130b.

In some embodiments, longitudinal side baffle 156 may have openings (e.g., trenches, gaps, apertures) through which shafts 164 may be disposed. Optionally, removable plates (not shown) may be provided to cover the openings during use and to allow access to the shafts 164. In some embodiments shafts 164 may include two shafts coupled by a shaft coupler 174. Shaft coupler 174 may allow the two shafts to be uncoupled to remove or replace the corresponding roller 130a. In some embodiments, drive assembly 168 may be disposed on an exterior portion 166 of the elongate enclosure 102, allowing drive assembly 168 to be accessed for maintenance. Drive assembly 168 may be coupled with a removable cover 170 in some embodiments. In other embodiments, the conveyor system may include a plurality of lubricant lines positioned to dispense lubricant onto portions of the roller assemblies.

FIG. 3D illustrates a view of a conveyor system with a control system, in accordance with various embodiments. In some embodiments, conveyor system 120 may include a control system 190 operatively coupled with the drive system (e.g., drives 140, 142, 144, 146, 148) and configured to control the drives. Control system 190 may include a programmable logic controller (PLC), a computer system, and/or both. Optionally, control system 190 may include a pre-existing PLC/computer system of a lumber kiln with additional programming to enable the control system to perform functions described herein.

In some embodiments, control system 190 may include one or more sensors 192. Sensor(s) 192 may be physically coupled with, and/or in wireless communication with, control system 190. Sensor(s) 192 may be disposed within elongate enclosure 102 and/or outside of elongate enclosure 102. Examples of suitable sensors 192 include, but are not limited to, photo-eyes, smoke/fire detectors, temperature sensors, humidity sensors, pressure sensors, cameras, scanners, motion detectors, and the like, alone or in various combinations.

In various embodiments, control system 190 may be configured to operate some or all of the drives independently of the other drives. Control system 190 may be configured to control individual drives to adjust the rotational direction/ speed of the corresponding rollers based on input from a human operator, a stored/programmed drying schedule, data from sensor(s) 192, and/or load characteristics such as lumber dimensions, wood species, desired moisture content, and/or initial moisture content. Optionally, control system 190 may be configured to adjust the operation of one or more other lumber kiln components, such as kiln doors, a steam injector system, a heat source, fans, dampers, and the like, based at least on data from the sensors. For example, control system 190 may be configured to determine, based on data from sensor(s) 192, that a load in the main chamber is nearing a desired moisture content, and to respond by increasing the rotational speed of the corresponding rollers on that side of the main chamber and/or adjusting a heat source to reduce the temperature in the main chamber.

In some embodiments, one or more of sensor(s) 192 may be configured to detect a fire within the lumber kiln, and control system 190 may be configured to respond by adjusting the speed and rotational direction of the rollers to evacuate loads from both ends of the lumber kiln. For example, control system 190 may typically operate the drives in a "CF" mode, in which the rollers on opposite sides of the conveyor sections are driven in opposite rotary directions, to convey loads along the flow paths in opposite directions through elongate enclosure 102. In response to detecting a fire condition within elongate enclosure 102, control system 190 may be configured to operate the drives in an "Evacuation" mode, in which the rollers on both sides of the proximal conveyor sections (e.g., loading section 122*a* and secondary section 124*a*) are driven in one rotary direction toward the first end/portal, and the rollers on both sides of the distal conveyor sections (e.g., secondary section 124*b* and loading section 122*b*) are driven in the opposite rotary direction toward the opposite end/portal. In embodiments with a middle section (e.g., main section 126), control system 190 may be configured to operate the drives to rotate all of the rollers in that section in one direction, to rotate the rollers on opposite sides in opposite directions, or to rotate the rollers in the proximal half of the middle section toward the first end while rotating the rollers in the distal half of the middle section toward the opposite end of elongate enclosure 102.

In other embodiments, control system 190 may be configured to operate the drives in a "unidirectional" mode, in which the rollers of the conveyor sections are driven in one rotary direction to convey loads in one direction through elongate enclosure 102. For example, in embodiments with rollers that form two or more paths of flow through elongate enclosure 102, the rollers may be driven in one direction to convey loads along the paths of flow in the same direction. In response to detecting a fire condition within elongate enclosure 102, control system 190 may be configured to operate the drives in an "Evacuation" mode generally as described above. Further, the flow path(s) may extend through portals in the distal end of elongate enclosure 102, and the portals may include one or more insulating members. The insulating member(s) may be configured to reduce airflow through the corresponding portal. In some embodiments, the insulating member may be a door, a curtain, or the like. The insulating member(s) may be configured to be pushed aside by a passing load. Alternatively, the insulating member may be selectively actuable to open and close the corresponding portal, and control system 190 may be configured to control the insulating member(s) in the "unidirectional" mode, in the "Evacuation" mode, or both.

In embodiments with a reciprocal path of flow (e.g., FIGS. 13A-13C), control system 190 may be configured to operate the drives in a "reciprocal" mode, in which the rollers of the first and second portions of the reciprocal path of flow are driven in opposite rotary directions, and the connector portion 178 is driven to move loads between the first and second portions, to thereby convey loads through one side the elongate enclosure 102, across the longitudinal axis, and through the other side of the elongate enclosure 102. In response to detecting a fire condition within elongate enclosure 102, control system 190 may be configured to operate the drives in an "Evacuation" mode. In some embodiments, additional rollers, a track, or the like may be provided to form one or more additional flow paths for conveying loads from the connector portion 178 to an area outside of the elongate enclosure 102, such that the loads can be driven onto the additional flow path by connector portion 178 to evacuate loads from the distal end of the elongate enclosure 102, and the "Evacuation" mode may be otherwise generally as described above. Optionally, the additional flow path(s) may extend through one or more portals in the distal end of elongate enclosure 102, and the portals may include one or more insulating members. The insulating member(s) may be configured to reduce airflow through the corresponding portal. For example, an insulating member may be a door, a curtain, or the like. The insulating member(s) may be configured to be pushed aside by a passing load. Alternatively, the insulating member may be selectively actuable to open and close the corresponding portal, and control system 190 may be configured to control the insulating member(s) in the "reciprocal" mode, in the "Evacuation" mode, or both. Alternatively, the "Evacuation" mode may involve driving all of the rollers along the first and second portions of the reciprocal flow path in one direction to evacuate loads from the proximal end of the elongate enclosure 102.

In some embodiments, control system 190 may be configured to determine the general location of the fire and to control the drives to rotate the rollers away from the location of the fire. In other embodiments, control system 190 may be configured to determine that a particular load is on fire and to operate the drives to evacuate that load through one of the portals without altering operation of rollers on the other flow path and/or upstream of the fire. Optionally, control system 190 may be configured to shut down the drives in response to determining, based on data from sensor(s) 192 and/or input from a human operator, that elongate enclosure 102 is empty of loads.

In some embodiments, control system 190 may include a manual input such as one or more switches/buttons. The manual input may be configured to receive input from an operator (e.g., actuation of a switch). Control system 190 may be configured to respond to the input by adjusting operation of one or more of the drives and/or other lumber kiln components accordingly. For example, control system 190 may be configured to respond by adjusting operation of the drives to evacuate loads from both ends of the lumber kiln simultaneously, to halt operations/cut power to the drives, and/or to resume operation of the drives according to a predetermined drying schedule. Some embodiments may lack a control system 190. In other embodiments, the conveyor system may have a manual input that has some or all the functionality described above, and some or all of the functionality of control system 190.

Figure 4A:
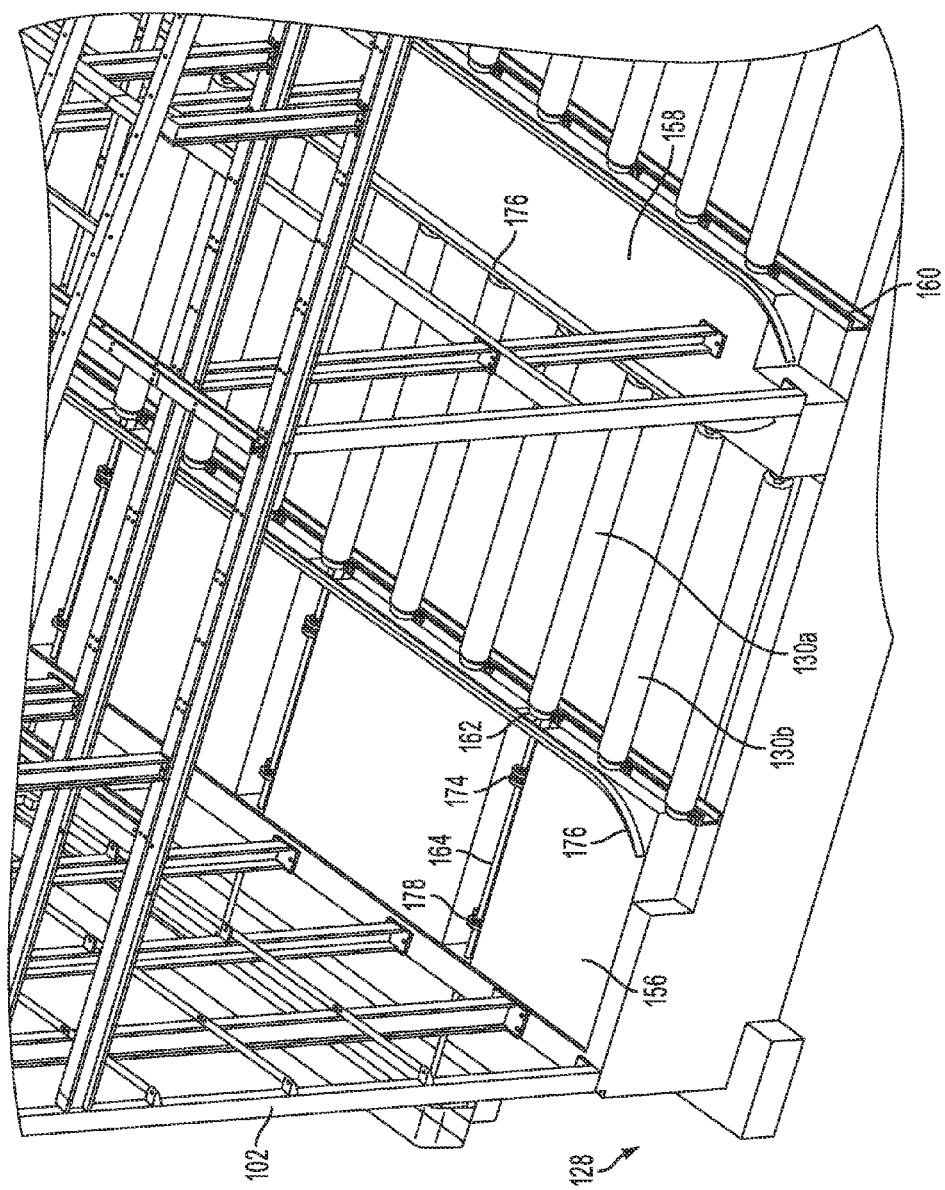
FIG. 4A illustrates a perspective view of a conveyor section.

FIG. 4A illustrates a perspective view of a conveyor section, in accordance with various embodiments. As illustrated, one or more guide members 176 may be provided along longitudinal center baffle 158 and/or longitudinal side baffles 156. Guide members 176 may be configured to maintain and/or correct the alignment of lumber loads as the loads are conveyed along a flow path. In some embodiments, guide members 176 may be beams or other linear members. Optionally, guide members 176 may have a curved portion at one or both ends. The curved portion may be positioned to engage lumber loads that are positioned off-center on the rollers. As the off-center load is conveyed along the flow path, the curved portion may urge the load back toward the center of the flow path, thereby correcting the load position on the rollers.

Figure 4B:
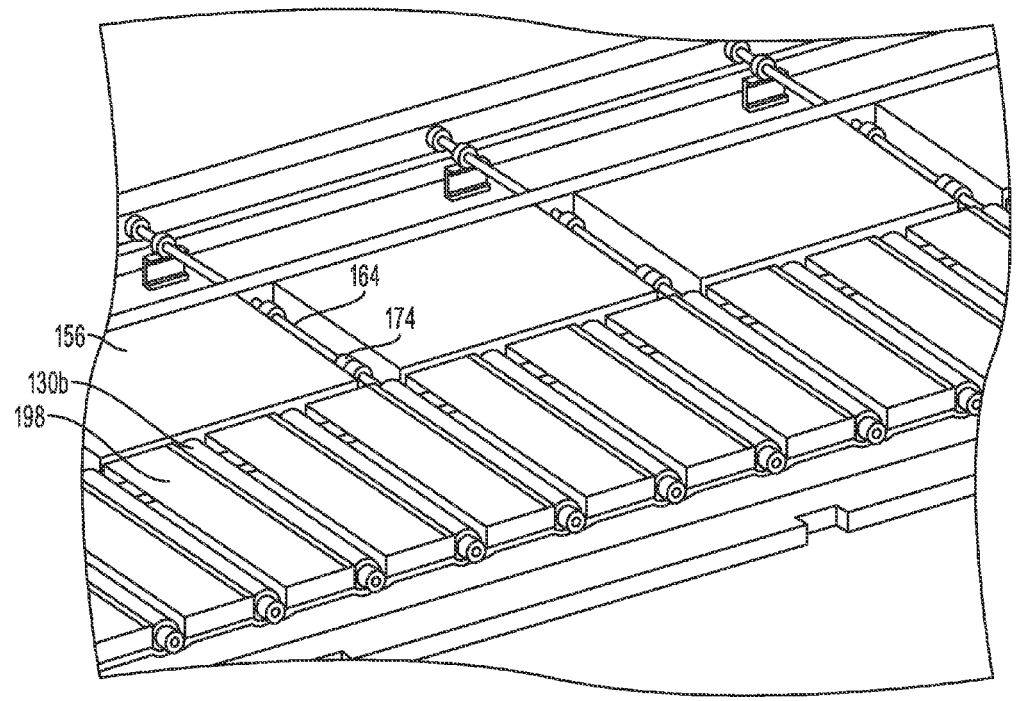
FIGS. 4B and 4C illustrate perspective and side views, respectively, of a portion of a conveyor section.
Figure 4C:
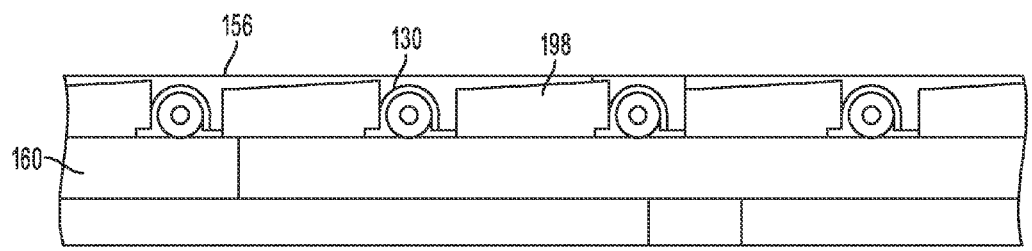

In some embodiments, supports 198 may be provided between adjacent rollers and positioned to engage a bottom surface of a load to prevent a leading or lagging end of a load from tilting vertically as it moves from one roller to the next (FIGS. 4B and 4C). For example, supports 198 may be plates mounted along support beam 160 between rollers 130*a*/130*b*. In other embodiments, supports 198 may be platforms, beams, or the like. In other embodiments, rollers 130 may be spaced closely together, such that adjacent ones of the rollers are in contact and/or are separated by less than 1 inch.

Figure 6:
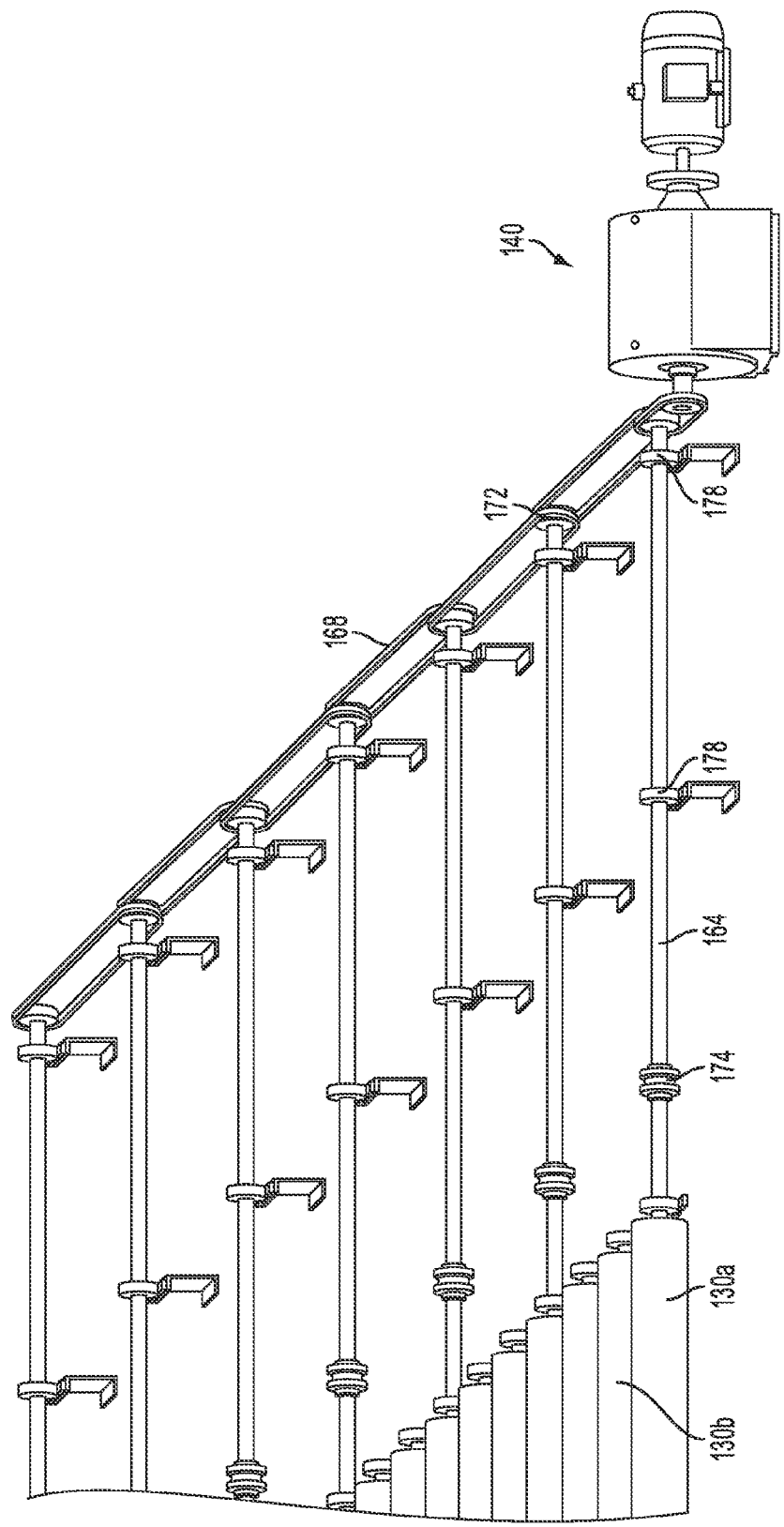
FIG. 6 illustrates another partial perspective view of a drive system.

FIGS. 5 and 6 illustrate partial perspective views of a drive system, in accordance with various embodiments. In some embodiments, retaining members 176 may be provided to support shafts 164 in desired positions relative to rollers 130 and drive couplers 172. Optionally, retaining members 176 may be fastened to, or embedded in, floor 128 (see e.g., FIG. 4A). In some embodiments, some or all of the drives 140, 142, 144, 146, and 148 may include a motor 180 coupled with a gearbox 182 (FIG. 5). In combination, motor 180 and gearbox 182 may be controlled to drive the corresponding rollers 130a forward, backward, and at variable speeds. In other embodiments, any suitable conventional drive may be used to drive rollers 130a.

Figure 7A:
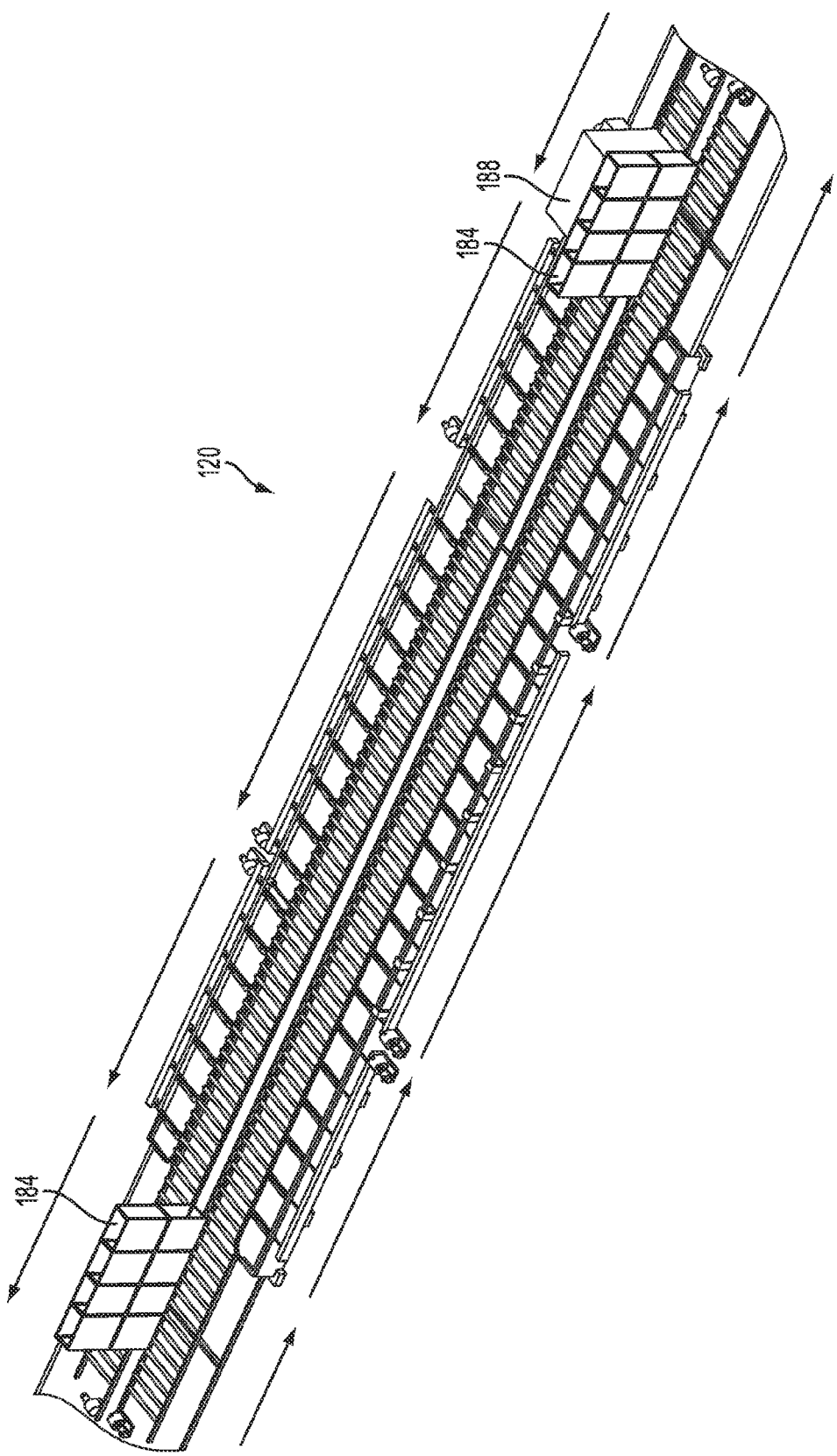
FIGS. 7A and 7B illustrates perspective views of a conveyor system with a drive system and alignment guides.
Figure 7B:
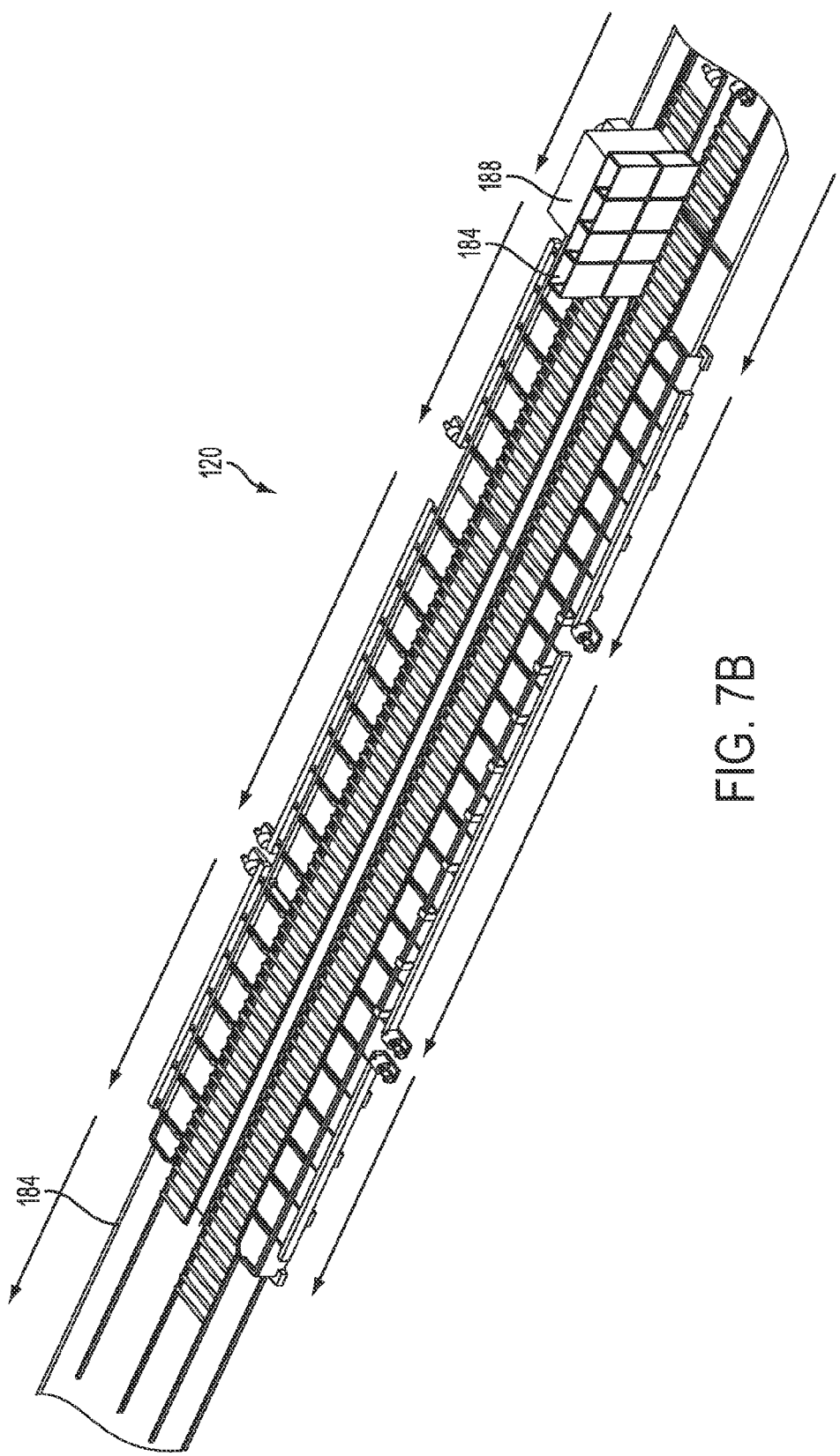

FIG. 7 illustrates a partial perspective view of a conveyor system, in accordance with various embodiments. In some embodiments, conveyor system 120 may include one or more alignment guides 184. Alignment guide(s) 184 may be disposed along the loading sections 122a and/or 122b, proximal to a lumber kiln portal. Alignment guides 184 may be positioned along both sides of a flow path. Alternatively, alignment guides 184 may be positioned between two flow paths, as illustrated in FIG. 7. Alignment guide(s) 184 may include plates, blocks, beams, or any other structure against which a load 184 may be pushed to align the load on the rollers. For example, in some embodiments, loads of lumber (e.g., stacks, sheets, or the like) may be loaded onto the rollers near alignment guide 184 by a forklift. The forklift may be used to push the load against the alignment guide 184 in order to center the load on the rollers before the load is conveyed into the elongate enclosure 102. Alternatively, the loads of lumber may be deposited onto the rollers and/or pushed against alignment guide 184 by another conveyor section or by conventional means. As shown for example in FIG. 8, alignment guide 184 may be positioned proximal to guide 176 or other guide component to help position loads entering or exiting elongate chamber 102.

Figure 9:
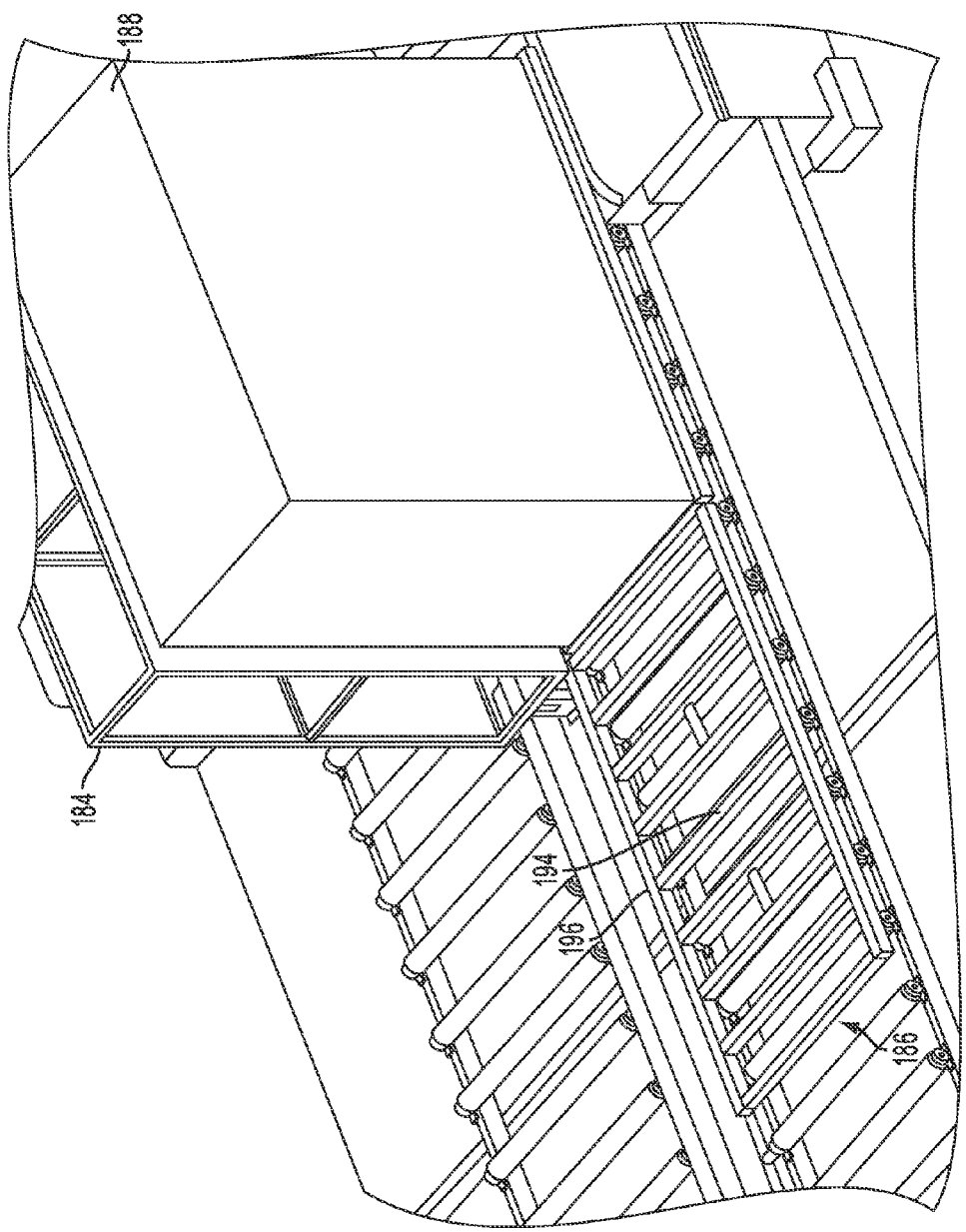
FIG. 9 illustrates a partial perspective view of a conveyor system with a tram.

In various embodiments, loads of lumber may be placed directly onto rollers 130 for transport. Alternatively, conveyor system 120 may optionally include one or more trams, platforms, or the like, that can be used to convey loads on the rollers. FIG. 9 illustrates a partial perspective view of a conveyor system with a tram, in accordance with various embodiments. Tram 186 may be configured to support a load on rollers 130. The dimensions and configuration of tram 186 may vary among embodiments. For example, tram 186 may include a plurality of lateral supports 194 connected by longitudinal supports 196. Alternatively, tram 186 may be or may include a solid sheet of material and/or platform. Loads 188 may be placed onto tram 186 before or after tram 186 is placed onto the rollers. In some embodiments, tram 186 may be used with a relatively short load to increase the number of rollers that are effectively in contact with, and conveying, the load. Using tram 186 may also help to prevent vertical displacement of the leading or lagging end of a load between rollers. Other embodiments may lack trams 186.

Figure 10:
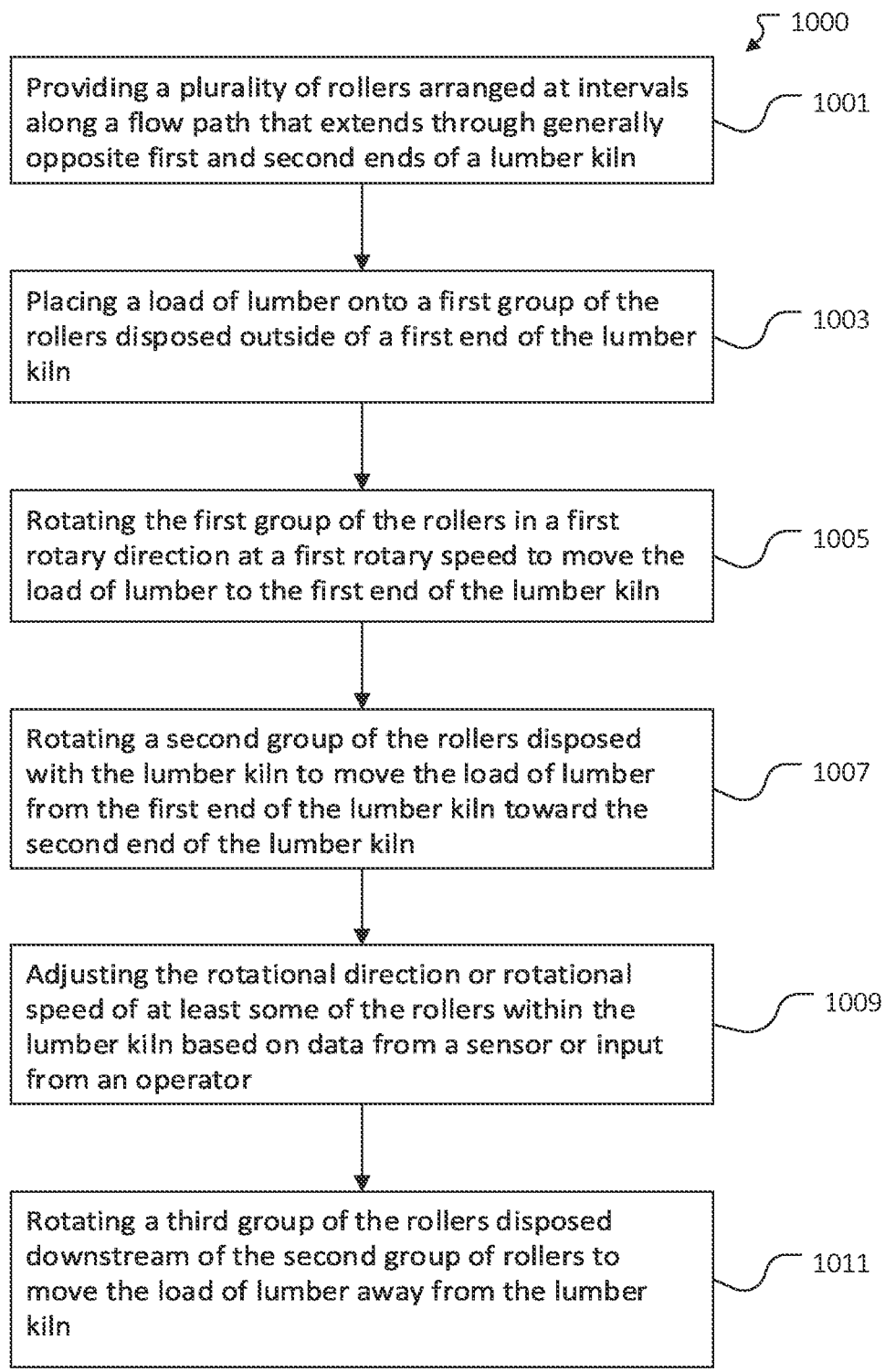
FIG. 10 illustrates a flow diagram of a method of conveying lumber through a lumber kiln.

FIG. 10 illustrates a flow diagram of a method for conveying lumber through a lumber kiln, in accordance with embodiments. Method 1000 may begin at block 1001.

At block 1001, a plurality of rollers (e.g., rollers 130/130a/130b) may be provided. The rollers may be arranged at intervals along a flow path (e.g., flow path 132/134) that extends through generally opposite first and second ends (e.g., first end 108, second end 110) of a lumber kiln (e.g., elongate enclosure 102). The rollers may be oriented transverse to the flow path, and may collectively form a load support surface. In some embodiments, the rollers may be arranged at intervals along two generally parallel flow paths that extend through the lumber kiln. The rollers may be the rollers of a conveyor system, such as conveyor system 120.

At block 1003, a load of lumber may be placed onto a first group of the rollers (e.g., rollers 130 of conveyor section 122a) disposed outside of a first end of the lumber kiln (e.g., first/proximal end 108). The load of lumber may be placed onto a first group of the rollers outside of the lumber kiln by a forklift, another conveyor, or by any conventional method.

At block 1005, the first group of the rollers may be rotated in a first rotary direction at a first rotary speed to move the load to the first end of the lumber kiln. In embodiments, the lumber kiln may have portals at the first end and at the opposite second end (e.g., second/distal end 110) to allow loads to enter/exit the kiln. The first group of rollers may be coupled with one or more corresponding drives (e.g., drives 140), and rotating the first group of rollers may include operating the corresponding drives. Optionally, block 1003 and/or other blocks of method 1000 may be controlled by a control system (e.g., control system 190). The load may be conveyed into the lumber kiln at block 1005 and/or at block 1007.

At block 1007, a second group of the rollers disposed within the lumber kiln may be rotated in the first rotary direction to move the load along the flow path from the first end of the lumber kiln to an opposite second end of the lumber kiln. The second group of rollers may be distributed among a plurality of conveyor sections (e.g., secondary sections 124a, 124b, main section 126), and the rollers of each section may be coupled with a corresponding one or more drives (e.g., drives 142, 144, 146). In some embodiments, the drives may be controlled to rotate at least some of the rollers of one conveyor section at a different rotary speed than the rollers of an adjacent conveyor section.

Optionally, at block 1009, the direction/speed of rotation of at least some of the rollers may be adjusted based on data from a sensor (e.g., sensor 192), input from an operator, and/or other information such as a drying schedule, a maintenance schedule, or the like. For example, the control system may determine, based on input from an operator or data from a sensor, that a fire has occurred in the lumber kiln. In response to the determination, the control system may control the drives to convey loads out of the lumber kiln through both ends of the lumber kiln. Conveying the loads out of the lumber kiln may include rotating the rollers in one portion of the lumber kiln (e.g., the proximal end/half) in a first rotary direction and rotating the rollers in another portion of the lumber kiln (e.g., the distal end/half) in the opposite rotary direction. As another example, the control system may determine, based on input from an operator or data from a sensor, that a load should be slowed, speeded, or stopped, and may adjust operation of one or more of the drives accordingly. Optionally, the control system may also operate one or more insulating members (e.g., insulating member 113) to open or close a corresponding one or more portals (e.g., portal 112) based on data from the sensor, input from an operator, and/or other information such as travel speed of a load, location of a load and/or proximity of the load to the portal(s), and the like.

In some embodiments, the direction/speed of rotation of at least some of the rollers may be adjusted to adjust a gap between consecutive loads of lumber. The desired gap may be determined based on a drying schedule and/or a maintenance schedule. For example, after a first load is conveyed into the lumber kiln, the rollers upstream of the first load may be slowed, stopped, or rotated in reverse for some time to provide a gap between the first load and a next consecutive load that is expected to dry more quickly than the first load. Thus, adjusting the gap may allow the next consecutive load to be conveyed more quickly through the lumber kiln than the first load. As another example, groups of rollers may be rotated at different speeds and/or in different directions based on the moisture content of a corresponding load of lumber. For example, a wireless moisture sensor may be positioned on or within a load of lumber. The load of lumber may be conveyed into the elongate enclosure. The control system may collect data from the wireless moisture sensor and adjust the rate at which the load is conveyed through the elongate enclosure based at least on the data. As such, the control system may be configured to move drier loads through the elongate enclosure more rapidly than wetter loads.

Optionally, in embodiments with rollers that form two or more separate paths of flow through the kiln, the control system may be configured to collect data from the wireless moisture sensor before the load is moved into the kiln and to select one of the paths of flow based on the data. This may allow wetter loads to be conveyed along one of the paths of flow and drier loads to be conveyed along another of the paths of flow to accommodate different drying requirements.

Likewise, the control system may be configured to use data from the wireless moisture sensor to set a desired gap and/or to time the entry of the load into the elongate enclosure. For example, the control system may be configured to determine a desired gap between loads based at least on the predicted or actual travel rates of the loads. The desired gap may allow the lagging load to be conveyed at a greater speed than the leading load along the same path of flow, such that the desired gap is substantially closed by the time the loads exit the elongate enclosure. This may help to maximize the volume of lumber within the elongate enclosure while allowing loads with different moisture contents and different drying requirements to be dried along the same path of flow. The desired gap may be set by timing the entry of the lagging load and/or by adjusting a travel speed of one or both of the loads within the elongate enclosure.

Alternatively, a gap may be created between loads to allow a portion of the lumber dryer (e.g., a portion of one of the secondary chambers or part of the main chamber) to be shut down or accessed by a maintenance worker while the other portions of the lumber kiln remain operational and loads continue to move along one or both flow paths. As another example, the direction/speed of rotation of at least some of the rollers may be adjusted to reduce a gap between consecutive loads of lumber. This may allow an operator to increase the volume of lumber within the elongate enclosure.

Optionally, at block 1011, a third group of the rollers disposed downstream of the second group of rollers may be rotated in the first rotary direction to move the load of lumber away from the lumber kiln. For example, some or all of the third group of the rollers may be positioned outside of the lumber kiln at the second end of the kiln. The rollers may be rotated by one or more drives independently of the other groups of rollers. In some embodiments, the third group of rollers may be used to convey lumber to the lumber kiln along one of the flow paths and to convey lumber away from the lumber kiln along the other flow path while the conveyor system is operated in one mode (e.g., "CF" mode). The third group of rollers may be used in another mode (e.g., "evacuation" mode) to convey lumber away from the lumber kiln along both flow paths simultaneously.

Figure 11:
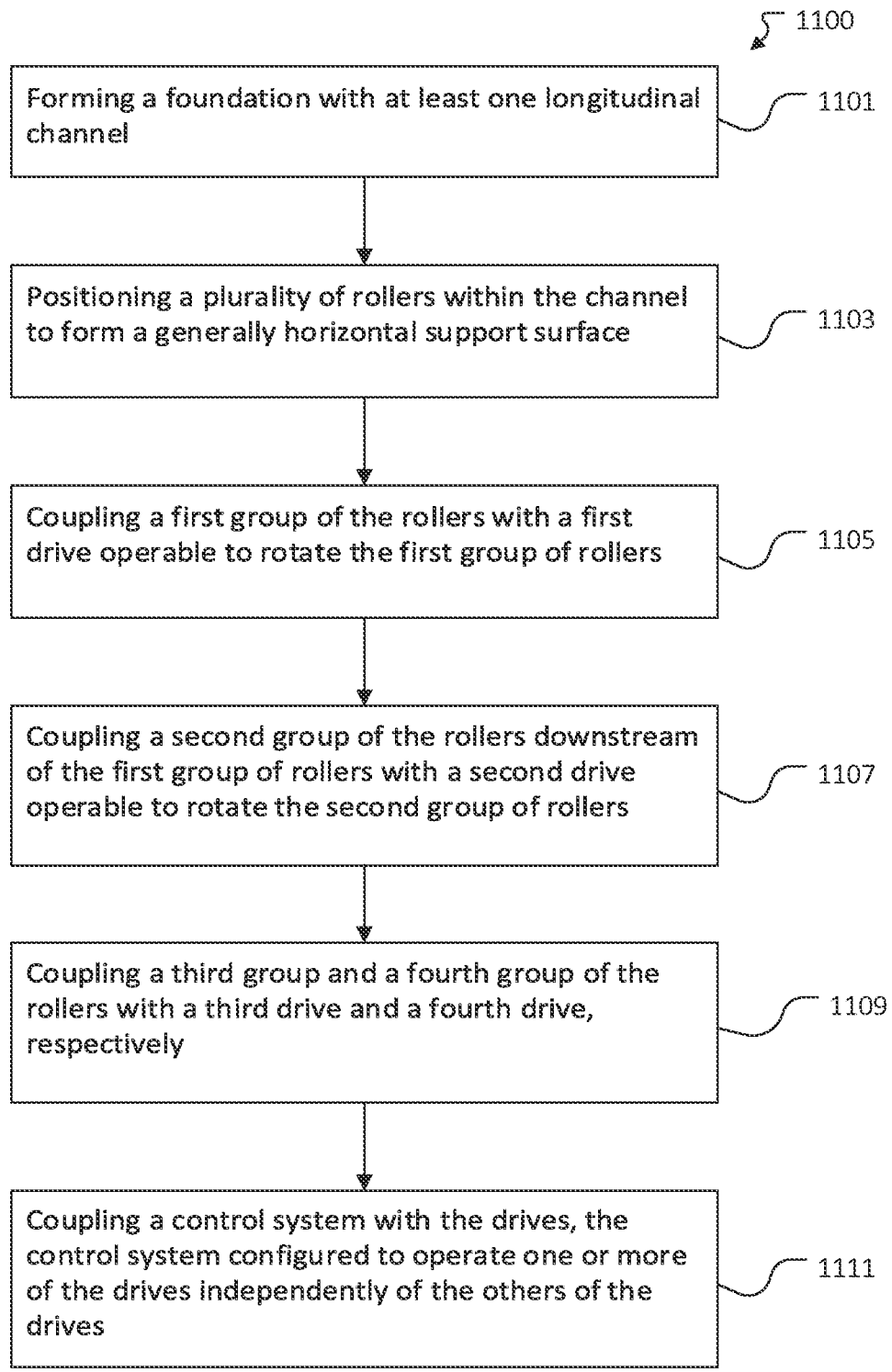
FIG. 11 illustrates a flow diagram of a method of installing a conveyor system.

FIG. 11 illustrates a flow diagram of a method of installing a conveyor system, in accordance with embodiments. Method 1100 may begin at block 1101.

At block 1101, a floor (e.g., floor 128) may be formed with at least one longitudinal channel (e.g., longitudinal channel 150). Forming the floor may include pouring concrete and/or assembling pre-formed concrete shapes (e.g., footer/support 152, bottom support 154, side baffle 156, center baffle 158, and/or sidewall 166) to form the channel. Alternatively, forming the floor may include removing portions of an existing foundation, such as the foundation of an existing lumber kiln, to form the channel. For example, an existing lumber kiln may be disposed on a concrete pad with rails coupled to the concrete pad, and forming the floor may include removing the rails and some or all of the concrete pad. Optionally, forming the floor may include modifying an existing foundation by adding/removing material from the foundation (e.g., cutting the foundation to carve out a channel from the surrounding portions of the foundation). In various embodiments, block 1101 may further include coupling one or more additional components (e.g., roll support 160 and/or retaining member 162) with the floor/foundation. In some embodiments, the floor may be formed with two generally parallel longitudinal channels. In other embodiments, the floor may be formed in two or more sections.

At block 1103, a plurality of rollers (e.g., rollers 130/130a/130b) may be positioned within the channel to form a generally horizontal support surface. The rollers may be arranged at intervals within the channel and rotatably mounted with their axes of rotation extending transverse to a longitudinal axis of the channel. The rollers may be arranged along a flow path (e.g., flow path 132/134) that extends generally parallel to a longitudinal axis of the floor. In some embodiments, the floor may be coupled with a bottom portion of a lumber kiln (e.g., elongate enclosure 102), and the flow path may be disposed through generally opposite first and second ends (e.g., first end 108, second end 110) of the lumber kiln. In some embodiments, the rollers may be arranged at intervals within two generally parallel channels that correspond to separate and generally parallel flow paths.

At block 1105, a first group of the rollers (e.g., rollers 130a of one side of conveyor section 122a, 124, 126, 124b, or 122b) may be coupled with a first drive (e.g., corresponding drive 140, 142, 144, 146, or 148) operable to rotate the first group of rollers. In various embodiments, block 1003/1005 may include coupling at least some of the rollers (e.g., roller 130a) with corresponding shafts (e.g., shafts 164). The shafts may be coupled with one or more corresponding drive couplers (e.g., drive couplers 172) such as sprockets or the like. The drive couplers may be coupled with the corresponding drive by a drive assembly (e.g., drive assembly 168), such as one or more chains or belts. In other embodiments, each shaft, pair of shafts, or trio of shafts may be coupled with a corresponding drive.

At block 1107, a second group of the rollers downstream of the first group of rollers may be coupled with a second drive operable to rotate the second group of rollers. In embodiments, the second group of rollers may be distributed among a plurality of conveyor sections (e.g., secondary sections 124a, 124b, main section 126), and the rollers of each section may be coupled with a corresponding one or more drives (e.g., drives 142, 144, 146). In some embodiments, the drives may be controlled to rotate at least some of the rollers of one conveyor section at a different rotary speed than the rollers of an adjacent conveyor section.

Optionally, at block 1109, a third group and a fourth group of the rollers may be coupled with a third drive and a fourth drive, respectively. In some embodiments, the first and second groups of rollers may be disposed within one of two channels in the floor, and the third and fourth groups may disposed within the other channel. In other embodiments, the third and fourth groups may be disposed downstream of the first and second groups of rollers, and in the same channel. Some of the groups of rollers may be disposed in a portion of a channel that is outside of a lumber kiln and other may be disposed in a portion of the channel that is within the lumber kiln. Alternatively, most or all of the rollers may be disposed within the lumber kiln. In some embodiments, the rollers may be arranged to form separate and generally parallel flow paths, and at block 1109 a connector portion (e.g., connector portion 178) may be operatively coupled with the flow paths. The connector portion may be operable to transfer loads of lumber from one flow path to the other flow path.

Optionally, method 1100 may further include modifying an existing kiln. In some embodiments, the existing kiln may be a single-track or multi-track batch-type kiln. If the existing kiln has a charge portal at only one end, modifying the existing kiln may include adding another charge portal (e.g., portal 112) at a generally opposite end. In other embodiments, modifying the existing kiln may include coupling one or more additional chambers (e.g., chambers 106a/106b) to one or both ends, and/or providing at least one of the portals with an insulating member (e.g., insulating member 113).

Optionally, at block 1111, a control system (e.g., control system 190) may be operatively coupled with the drives. The control system may be configured to operate one or more of the drives independently of the other drives. In some embodiments, block 1111 may further include coupling one or more sensors (e.g., sensor 192) with the control system and/or programming the control system to control the direction/speed of rotation of the groups of rollers based on data from a sensor and/or input from an operator.

Figure 12:
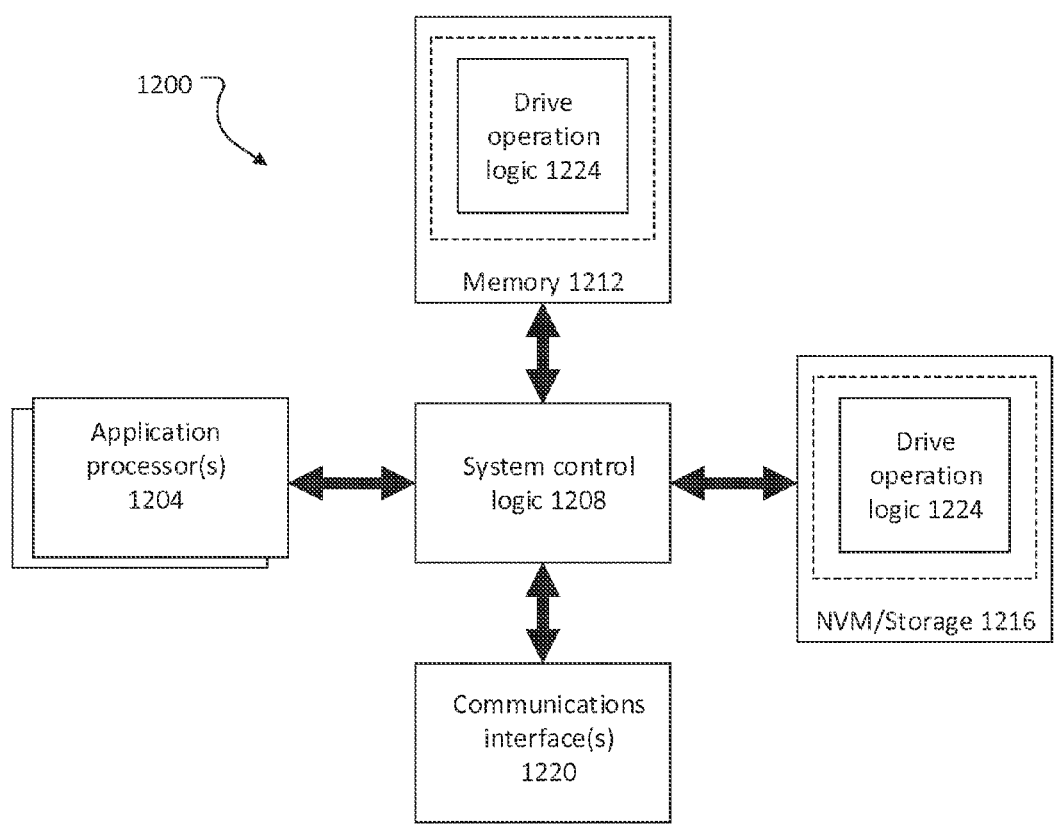
FIG. 12 illustrates an example of a computer system suitable for practicing embodiments of the present disclosure.

FIG. 12 illustrates an example of a computer system suitable for practicing embodiments of the present disclosure. As illustrated, a computer system 1200 may include system control logic 1208 coupled to one or more processor(s) 1204, system memory 1212 coupled to system control logic 1208, non-volatile memory (NVM)/storage 1216 coupled to system control logic 1208, sensor 1282 coupled to system control logic 1208, controller 1236 coupled to system control logic 1208, and one or more communications interface(s) 1220 coupled to system control logic 1208. In various embodiments the one or more processors 1204 may be a processor core.

System control logic 1208 may include any suitable interface controller(s) to provide for any suitable interface to at least one of the processor(s) 1204 and/or to any suitable device or component in communication with system control logic 1208. System control logic 1208 may also interoperate with an output, such as a display, for communication of information to a user. In various embodiments the display may include one of various display formats and forms, such as, for example, liquid-crystal displays, cathode-ray tube displays, and e-ink displays. In various embodiments the display may include a touch screen.

System control logic 1208 may include one or more memory controller(s) to provide an interface to system memory 1212. System memory 1212 may be used to load and store data and/or instructions, for example, for computer system 1200. System memory 1212 may optionally include volatile memory, such as suitable dynamic random access memory ("DRAM").

System control logic 1208, in one embodiment, may include one or more input/output ("I/O") controller(s) to provide an interface to NVM/storage 1216 and communications interface(s) 1220.

NVM/storage 1216 may be used to store data and/or instructions. NVM/storage 1216 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s).

The NVM/storage 1216 may include a storage resource that may physically be a part of a device on which computer system 1200 is installed, or it may be accessible by, but not necessarily a part of, the device. For example, the NVM/storage 1216 may be accessible over a network via the communications interface(s) 1220.

System memory 1212, NVM/storage 1216, and/or system control logic 1208 may include, in particular, temporal and persistent copies of drive operation logic 1224. Drive operation logic 1224 may include instructions operable, upon execution by at least one of the processor(s) 1204, to cause computer system 1200 to control operation of the conveyor system drives (e.g., drives 140, 142, 144, 146, and/or 148). NVM/storage 1216 may also include one or more drying schedule algorithms and/or other logic for controlling various components and operating parameters of a lumber kiln.

Controller 1236 may be operatively coupled to one or more of the conveyor system drives. Controller 1236 may be configured to control the drives to adjust the rotary speed and/or rotary direction of the corresponding rollers (e.g., rollers 130a) in response to instructions from computer system 1200.

Communications interface(s) 1220 may provide an interface for scanner optimizer system 1200 to communicate over one or more network(s) and/or with any other suitable device. Communications interface(s) 1220 may include any suitable hardware and/or firmware, such as a network adapter, one or more antennas, a wireless interface, and so forth. In various embodiments, communication interface(s) 1220 may include an interface for scanner optimizer system 1200 to use NFC, optical communications (e.g., barcodes), BlueTooth or other similar technologies to communicate directly (e.g., without an intermediary) with another device. In various embodiments, the wireless interface may interoperate with radio communications technologies such as, for example, WCDMA, GSM, LTE, and the like.

The capabilities and/or performance characteristics of processors 1204, memory 1212, and so forth may vary. In various embodiments, control system 1200 may include, but is not limited to, a PLC, a smartphone, a computing tablet, a laptop computer, a desktop computer, and/or a server, alone or in any suitable combination. In various embodiments control system 1200 may include one or more PLC systems known in the art.

In some embodiments, at least one of the processor(s) 1204 may be packaged together with system control logic 1208 and/or drive operation logic 1224. For example, at least one of the processor(s) 1204 may be packaged together with system control logic 1208 and/or drive operation logic 1224 to form a System in Package ("SiP"). In other embodiments, at least one of the processor(s) 1204 may be integrated on the same die with system control logic 1208 and/or drive operation logic 1224. For example, at least one of the processor(s) 1204 may be integrated on the same die with system control logic 1208 and/or drive operation logic 1224 to form a System on Chip ("SoC").

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A lumber drying system comprising:
    a lumber kiln, wherein the lumber kiln includes an enclosure with a first end and a generally opposite second end, a heated zone between said ends, a first portal located at the first end and dimensioned to allow passage of a load of stacked lumber, and a floor; and
    a conveyor system coupled to the lumber kiln, the conveyor system comprising
        a plurality of first rollers coupled with the floor of the lumber kiln in fixed locations and spaced apart at intervals along a first flow path that extends through the first portal and the heated zone, the first rollers being rotatable around corresponding axes of rotation that are oriented transverse to the first flow path, and
        a drive system coupled with the first rollers, the drive system selectively operable to drive some or all of the first rollers in a first rotary direction and in a generally opposite second rotary direction, wherein the drive system includes a first motor disposed outside of the enclosure and coupled with one or more of the first rollers,
    wherein the conveyor system is configured to move the load of stacked lumber in a forward direction and in a reverse direction, respectively, along the first flow path on at least the first rollers.

2. The lumber drying system of claim 1, further including a plurality of second rollers disposed along the first flow path, the first rollers and the second rollers collectively forming a lumber support surface.

3. The lumber drying system of claim 2, wherein at least some of the second rollers are disposed between said intervals and freely rotatable in the first and second rotary directions.

4. The lumber drying system of claim 2, wherein the second rollers are positioned downstream of the first rollers along the first flow path, the drive system includes a second motor disposed outside of the enclosure and operatively coupled to one or more of the second rollers, and the drive system is operable to drive said one or more of the first rollers independently of said one or more of the second rollers.

5. The lumber drying system of claim 4, wherein the drive system further includes a first drive assembly configured to operatively connect the first motor to said one or more of the first rollers and a second drive assembly configured to operatively connect the second motor to said one or more of the second rollers, each of the drive assemblies includes a shaft coupled to a corresponding one of the rollers and a belt or chain coupled to the shaft and a corresponding one of the motors.

6. The lumber drying system of claim 4, wherein at least some of the second rollers are disposed outside of the enclosure and at least some of the first rollers are disposed within the enclosure.

7. The lumber drying system of claim 1, further including a plurality of second rollers coupled with the floor and spaced apart at intervals along a second flow path that extends through the enclosure generally parallel to the first flow path, the second rollers being rotatable around corresponding axes of rotation that extend transverse to the second flow path, wherein the second rollers are configured to support a load of stacked lumber thereon, and the drive system is configured to drive the second rollers.

8. The lumber drying system of claim 7, wherein the drive system includes a second motor coupled with the second rollers, and the first and second motors are selectively operable to drive the corresponding rollers at different speeds.

9. The lumber drying system of claim 1, wherein the conveyor system includes a plurality of conveyor sections and the drive system further includes one or more additional first motors, each of the conveyor sections having at least one of the first motors coupled with a corresponding one or more of the first rollers, and at least two of the first motors are operable independently of one another to drive the corresponding first rollers at different speeds or in different rotary directions.

10. The lumber drying system of claim 9, further including a plurality of second rollers coupled with the floor and spaced apart at intervals along a second flow path that is generally parallel to and spaced apart from the first flow path, each of the conveyor sections further including one or more of the second rollers, wherein the second rollers are configured to support a second load of stacked lumber thereon, and the drive system is further configured to drive the second rollers.

11. The lumber drying system of claim 10, the drive system further including a plurality of second motors, each of said second motors operatively coupled with one or more of the second rollers of a corresponding one of said conveyor sections, wherein at least one of the second motors is operable independently of at least one of the first motors.

12. The lumber drying system of claim 4, further including a control system coupled with the drive system and configured to control one or more of said motors independently of the others of said motors.

13. The lumber drying system of claim 12, wherein the control system is configured to cause the first motor to drive said one or more of the first rollers at a first speed and said one or more of the second rollers at a second speed to thereby adjust a gap between two loads of lumber on the first flow path.

14. The lumber drying system of claim 13, wherein the control system includes a sensor configured to detect a moisture content of a load of lumber, and the control system is further configured to cause the motors to adjust a rate of travel of at least one of the loads of lumber through the enclosure based at least on data from the sensor.

15. The lumber drying system of claim 11, wherein a first one of the conveyor sections is disposed outside of the enclosure proximal to said first end, a second one of said conveyor sections is disposed at least partially within the enclosure proximal to said first end, and said first and second ones of the conveyor sections are collectively operable to convey workpieces through the first portal.

16. The lumber drying system of claim 15, wherein the enclosure includes a second portal at the second end, a third one of the conveyor sections is disposed at least partially within the enclosure proximal to said second end, and a fourth one of the conveyor sections is disposed outside the enclosure proximal to said second end, and said third and fourth ones of the conveyor sections are collectively operable to convey workpieces through the second portal.

17. The lumber drying system of claim 16, wherein the enclosure has two end zones at opposite ends of the heated zone, the second and third ones of the conveyor sections are disposed generally along the two end zones, respectively, and a fifth one of the conveyor sections is disposed generally along the heating zone.

18. The lumber drying system of claim 11, further including a control system coupled with the drive system, wherein each of said flow paths includes substantially half of the rollers, and the control system is operable to control the drive system to drive at least some of the first rollers in the forward direction, and at least some of the rollers of the second flow path in the reverse direction, such that loads of lumber along the first and second flow paths travel in opposite directions through the enclosure.

19. The lumber drying system of claim 18, wherein each of said flow paths includes a proximal portion, a middle portion, and a distal portion, and the control system is selectively operable to control the drive system to rotate at least some of the rollers of the proximal portions toward the first portal while rotating at least some the rollers of the distal portions toward the second portal to thereby move loads of lumber out of the enclosure through both of said opposite ends simultaneously.

20. The lumber drying system of claim 19, further including one or more sensors disposed on or within the enclosure and operatively coupled with the control system, wherein the one or more sensors includes a sensor configured to detect a fire within the enclosure, and the control system is further configured to control the first and second drives based at least on data received from the one or more sensors.

21. The lumber drying system of claim 1, wherein the enclosure has a longitudinal axis defining generally opposite first and second sides of the enclosure, the first rollers are disposed along the first side, and the first flow path extends along the first side, the conveyor system further comprising a plurality of second rollers coupled with the floor and spaced apart at intervals along a second flow path that extends along the second side, wherein the drive system further includes one or more additional first motors coupled with corresponding ones of the first rollers and a plurality of second motors coupled with corresponding ones of the second rollers, some or all of the motors are located outside of the enclosure, and the drive system is selectively operable to drive at least one of the second motors independently of at least one of the first motors.

22. The lumber drying system of claim 21, wherein the first and second flow paths form first and second portions, respectively, of a reciprocal path of flow, the conveyor system further including a connector portion configured to move the load of lumber from a distal end of the first portion to a distal end of the second portion.

23. The lumber drying system of claim 22, further including a control system operatively coupled with the drive system and configured to control the drive system in a first mode to rotate the first rollers in the forward direction and the second rollers in the reverse direction to thereby move the load of lumber at least partially through the heated zone on the first side in the forward direction, across the longitudinal axis on the connector portion, and at least partially through the heated zone on the second side in the reverse direction.

24. The lumber drying system of claim 23, further including an additional group of rollers spaced apart at intervals along an additional flow path that extends from the connector portion through one side of the enclosure, wherein the control system is further configured to control the drive system in a second mode to move the load of lumber from the connector portion to the additional group of rollers.

25. The lumber drying system of claim 23, wherein the enclosure includes a second portal at the first end, the first and second portals are disposed on opposite sides of the longitudinal axis, and the control system is further configured to control the drive system in a second mode to rotate the first rollers and the second rollers in the reverse direction to thereby evacuate the load of lumber from the enclosure through the first and second portals.

26. The lumber drying system of claim 24, wherein the enclosure includes a second portal, the additional flow path extends through the second portal, and the second portal includes an insulating member.

27. The lumber drying system of claim 26, wherein the control system is further configured to control a position of the insulating member.

28. The lumber drying system of claim 21, further including a control system operatively coupled with the drive system and configured to control the drive system in a first mode to rotate the first rollers and the second rollers in the forward direction to thereby move loads of lumber through the enclosure along the first and second flow paths in the forward direction.

29. The lumber drying system of claim 28, wherein the control system is further configured to control the drive system in a second mode to move some of the loads of lumber out of the enclosure through the first portal while moving others of the loads of lumber out of the enclosure through the second portal.

30. The lumber drying system of claim 29, wherein the second portal includes an insulating member selectively actuable to open and close the second portal, and the control system is further configured to control a position of the insulating member.

* * * * *